(12) United States Patent
Nakayama et al.

(10) Patent No.: US 11,549,597 B2
(45) Date of Patent: Jan. 10, 2023

(54) VENTILATION UNIT

(71) Applicant: NITTO DENKO CORPORATION, Ibaraki (JP)

(72) Inventors: Yusuke Nakayama, Ibaraki (JP); Youzou Yano, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/543,291

(22) Filed: Dec. 6, 2021

(65) Prior Publication Data
US 2022/0090688 A1    Mar. 24, 2022

Related U.S. Application Data

(63) Continuation of application No. 16/608,279, filed as application No. PCT/JP2018/016999 on Apr. 26, 2018, now Pat. No. 11,226,044.

(30) Foreign Application Priority Data

Apr. 28, 2017 (JP) .............. JP2017-089673

(51) Int. Cl.
*H01M 4/02* (2006.01)
*F16K 7/17* (2006.01)
(Continued)

(52) U.S. Cl.
CPC ............ *F16K 7/17* (2013.01); *F16K 17/02* (2013.01); *H01M 50/317* (2021.01); *H01M 2220/20* (2013.01)

(58) Field of Classification Search
CPC ..................................................... H01M 4/02
See application file for complete search history.

(56) References Cited

U.S. PATENT DOCUMENTS 4,100,894 A    7/1978  Tamura
6,182,698 B1   2/2001  Barak
(Continued)

FOREIGN PATENT DOCUMENTS

CN        85200083 U    8/1986
CN         2115436 U    9/1992
(Continued)

OTHER PUBLICATIONS

Aug. 7, 2018 Search Report issued in Internation Patent Application No. PCT/JP2018/016999.
(Continued)

*Primary Examiner* — Jacob B Marks
(74) *Attorney, Agent, or Firm* — Oliff PLC

(57) ABSTRACT

The ventilation unit includes: an explosion-proof valve that permits gas to flow from the inside of a housing to the outside of the housing when internal pressure within the housing is higher than external pressure outside the housing by a value larger than or equal to a predetermined value, and is capable of returning to block the flow of the gas from the inside of the housing to the outside of the housing; and a ventilation membrane that permits gas to flow between the inside and the outside of the housing even when a pressure difference between the internal pressure and the external pressure is less than the predetermined value.

20 Claims, 14 Drawing Sheets

(51) Int. Cl.
*F16K 17/02* (2006.01)
*H01M 50/317* (2021.01)

(56) References Cited

U.S. PATENT DOCUMENTS

| | | |
|---|---|---|
| 2009/0029641 A1 | 1/2009 | Furuuchi |
| 2017/0036393 A1 | 2/2017 | Ishii et al. |
| 2018/0219200 A1 | 8/2018 | Albukrek et al. |
| 2018/0292020 A1 | 10/2018 | Kleinke et al. |
| 2020/0032924 A1 | 1/2020 | Sanders et al. |

FOREIGN PATENT DOCUMENTS

| | | | |
|---|---|---|---|
| CN | 1189208 | A | 7/1998 |
| CN | 205298645 | U | 6/2016 |
| DE | 102017003360 | B3 | 7/2018 |
| EP | 1 884 695 | A1 | 2/2008 |
| JP | S48-076425 | U | 9/1973 |
| JP | S61-061367 | U | 4/1986 |
| JP | S61-171809 | U | 10/1986 |
| JP | 2008-253956 | A | 10/2008 |
| JP | 2013-168293 | * | 8/2013 |
| JP | 2013-168293 | A | 8/2013 |
| JP | 2015-205420 | A | 11/2015 |
| JP | 2016-023753 | A | 2/2016 |
| WO | 2017/017199 | A1 | 2/2017 |
| WO | 2018183804 | A1 | 10/2018 |

OTHER PUBLICATIONS

Dec. 1, 2020 Extended Search Report issued in European Patent Application No. 18790376.0.

Apr. 13, 2021 Office Action issued in Japanese Patent Application No. 2019-514622.

Sep. 7, 2021 Notice of Allowance Issued in U.S. Appl. No. 16/608,279.

* cited by examiner

VENTILATION UNIT

This is a continuation application of U.S. patent application Ser. No. 16/608,279, filed Oct. 25, 2019, which is a National Stage Entry of PCT/JP2018/016999 filed Apr. 26, 2018, which claims priority to Japanese Patent Application JP 2017-089673 filed Apr. 28, 2017. The disclosures of each application are hereby incorporated by reference in their entireties.

TECHNICAL FIELD

The present invention relates to a ventilation unit.

BACKGROUND ART

Conventionally, a technique that provides a function of a ventilation hole to an explosion-proof valve of a battery pack to eliminate the need to separately provide the ventilation hole including a ventilation membrane has been suggested.

For example, an explosion-proof valve described in Patent Document 1 includes: an explosion-proof valve case formed of a synthetic resin, and forming an annular ring shape; an O-ring sealing between the explosion-proof valve case and a pack case; a circular sheet-like ventilation membrane attached to the case so as to close a central opening of the explosion-proof valve case; and a circular plate-like protector formed of a synthetic resin, and overlapped and arranged outside the ventilation membrane. Notches as ventilation holes are provided around the protector, and a small amount of air can go in and out via the ventilation membrane. When an internal pressure rapidly rises at battery abnormality, the protector is folded, and locking by locking projections is released to drop the protector, and therefore, a large passage cross-sectional area is secured instantaneously to release the internal pressure.

CITATION LIST

Patent Literature

Patent Document 1: Japanese Patent Application Laid-Open Publication No. 2013-168293

SUMMARY OF INVENTION

Technical Problem

For example, in a vehicle-mounted large battery pack, it is desirable to use a ventilation member (for example, a ventilation membrane) for eliminating a pressure difference between the inside and the outside of a housing with temperature changes in normal operation, and to use an explosion-proof valve for eliminating a pressure difference due to pressure increase when abnormality occurs. This is because there is a possibility that the ventilation member eliminating the pressure difference at the normal time cannot sufficiently release the pressure in the housing that is instantaneously increased when abnormality occurs. Considering man-hours for assembling these ventilation member and explosion-proof valve to the housing, it is desirable that the ventilation member and the explosion-proof valve are unitized.

On the other hand, from the standpoint of ensuring functions of the ventilation member and the explosion-proof valve, it is desirable that normal operations of these components can be inspected before shipment of the products.

An object of the present invention is to provide a ventilating unit that can realize elimination of a differential pressure in normal time and elimination of a differential pressure when abnormality occurs while enabling to make an inspection before shipment.

Solution to Problem

Under such an object, the present invention provides a ventilation unit (1) including: a first ventilation body (10) that permits gas to flow from an inside of a housing (120) to an outside of the housing (120) when internal pressure, which is pressure inside the housing (120), is higher than external pressure, which is pressure outside the housing (120), by a value not less than a predetermined value, and is capable of returning to block flow of the gas from the inside of the housing (120) to the outside of the housing (120); and a second ventilation body (40) that permits gas to flow between the inside of the housing (120) and the outside of the housing (120) even when a pressure difference between the internal pressure and the external pressure is less than the predetermined value.

Here, a support member (30) that supports the first ventilation body (10) and the second ventilation body (40) may be further included.

Moreover, a holding member (70) that holds the support member (30) and is attached to the housing (120) may be further included.

Moreover, the second ventilation body (40) may prevent a liquid and a solid from penetrating into the inside of the housing (120) from the outside of the housing (120).

Moreover, the present invention provides a ventilation unit (1) including: a first ventilation body (10) that closes a first flow path (R1) when a pressure difference between internal pressure, which is pressure inside a housing (120), and external pressure, which is pressure outside the housing (120), is a value less than a predetermined value, and is elastically deformed to open the first flow path (R1) when the internal pressure is higher than the external pressure by a value not less than the predetermined value; and a second ventilation body (40) that is provided to a second flow path (R2) and permits gas to flow between the inside of the housing (120) and the outside of the housing (120) via the second flow path (R2) even when the pressure difference between the internal pressure and the external pressure is less than the predetermined value.

Here, a support member (30) that supports the first ventilation body (10) and the second ventilation body (40) may be further included.

Moreover, a holding member (70) that holds the support member (30) and is attached to the housing (120) may be further included.

Moreover, the support member (30) may be attached to the holding member (70) by being inserted into the holding member (70), the second ventilation body (40) may be fastened to the support member (30), and the first ventilation body (10) is sandwiched between the support member (30) and the holding member (70).

Moreover, the holding member (70) may include a butted portion (72), against which a jig (250) used in inserting the support member (30) into the holding member (70) is butted, and a position of the support member (30) with respect to the holding member (70) may be determined by inserting the support member (30) into the holding member (70) until the jig (250) is butted against the butted portion (72).

Moreover, the first ventilation body (10) may close the first flow path (R1) by contacting the holding member (70), and may open the first flow path (R1) by separating from the holding member (70).

Note that the above signs in this section are provided for exemplification in describing the present invention, and the present invention is not restricted by these signs.

Advantageous Effects of Invention

According to the present invention, it is possible to provide a ventilating unit that can realize elimination of a differential pressure in normal time and elimination of a differential pressure when abnormality occurs, while enabling to make an inspection before shipment.

DESCRIPTION OF EMBODIMENTS

Hereinafter, exemplary embodiments according to the present invention will be described in detail with reference to attached drawings.

First Exemplary Embodiment

Figure 1:
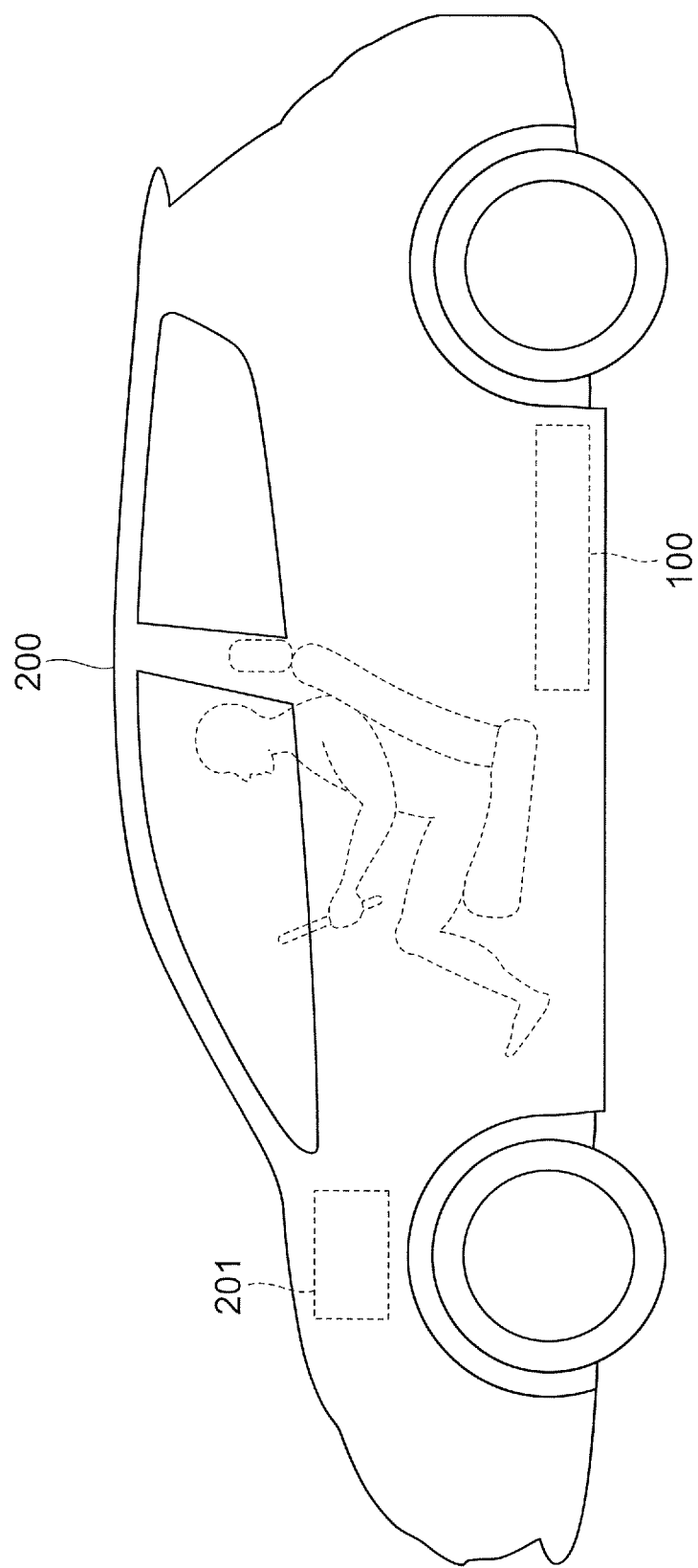
FIG. 1 is a diagram showing a general configuration of a vehicle loaded with a battery pack to which a ventilation unit related to a first exemplary embodiment is applied.

FIG. 1 is a diagram showing a general configuration of a vehicle 200 loaded with a battery pack 100 to which a ventilation unit 1 related to a first exemplary embodiment is applied. FIG. 1 is a diagram viewing the vehicle 200 from the side.

Figure 2:
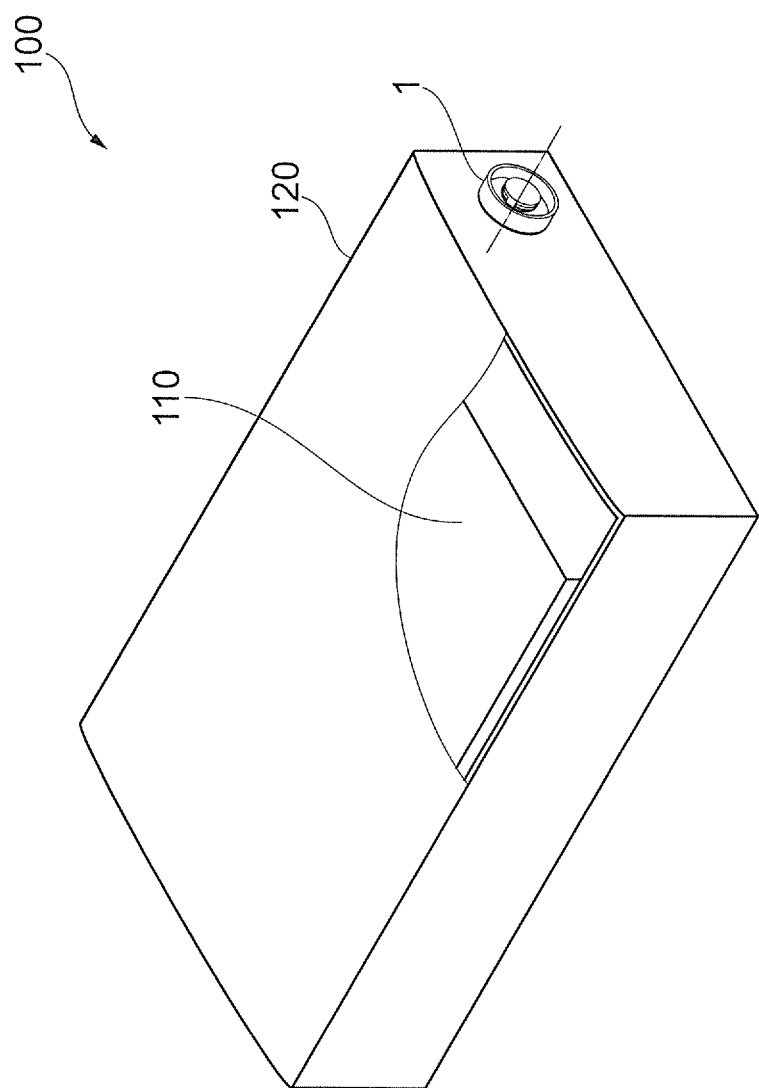
FIG. 2 is a diagram showing a general configuration of the battery pack.

FIG. 2 is a diagram showing a general configuration of the battery pack 100.

The vehicle 200 includes: a motor unit 201 provided to a front portion of a vehicle body; and the battery pack 100 provided to a bottom portion of the vehicle body to supply the motor unit 201 with electric power. The vehicle 200 is an electric vehicle that drives front wheels with a drive force outputted from the motor unit 201.

The battery pack 100 includes: a battery 110; a controller (not shown) for controlling the battery 110; various kinds of sensors (not shown) for detecting the state of the battery 110; and a housing 120 that contains the battery 110 or the controller.

The battery pack 100 also includes a ventilation unit 1 that is attached to the housing 120 to adjust a pressure difference between an internal pressure of the housing 120 and an external pressure of the housing 120. The ventilation unit 1 is attached to the housing 120 so that a centerline direction to be described later is horizontal with the ground.

{Ventilation Unit 1}

Figure 3:
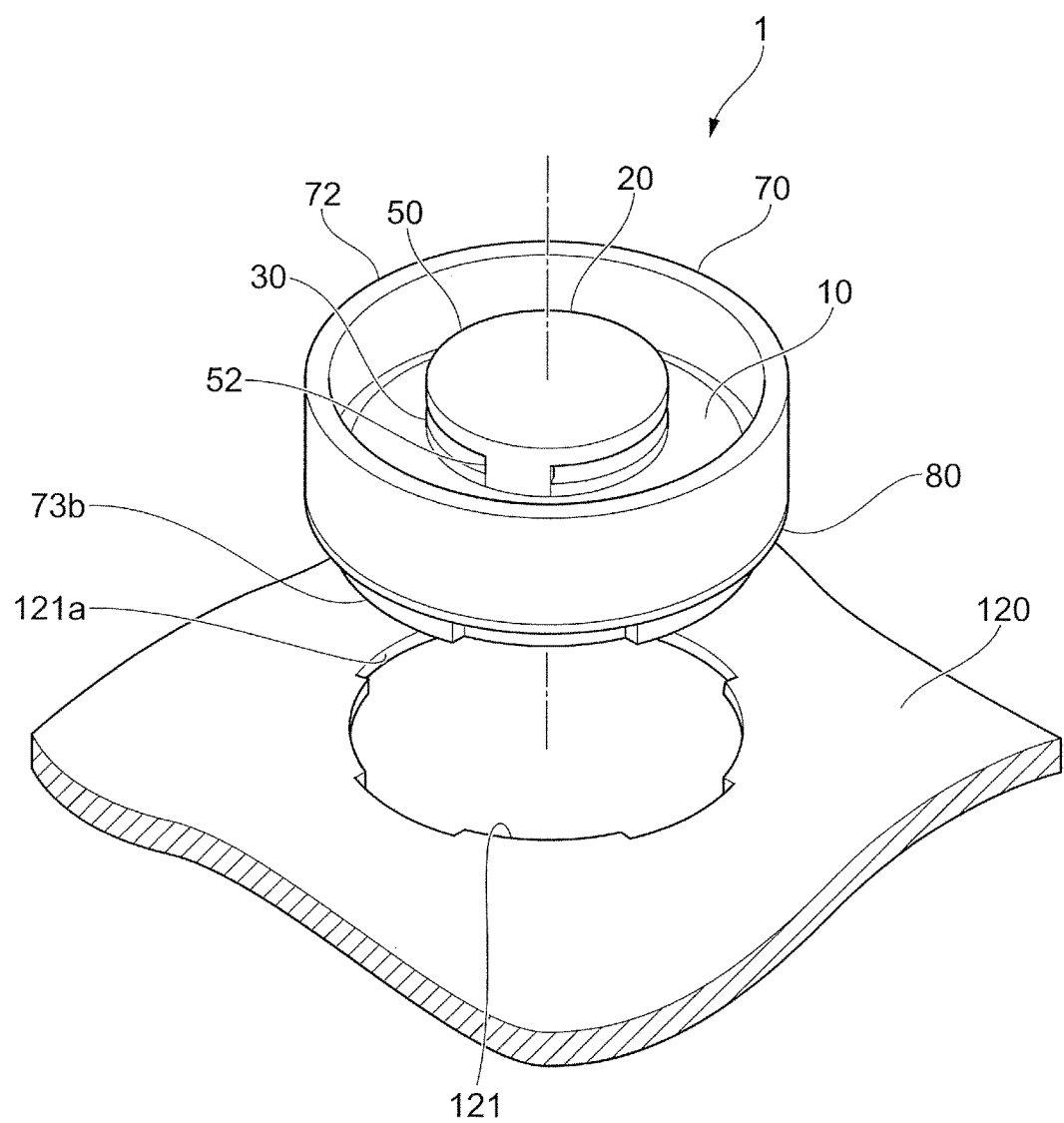
FIG. 3 is a perspective view showing the ventilation unit related to the first exemplary embodiment.
Figure 4:
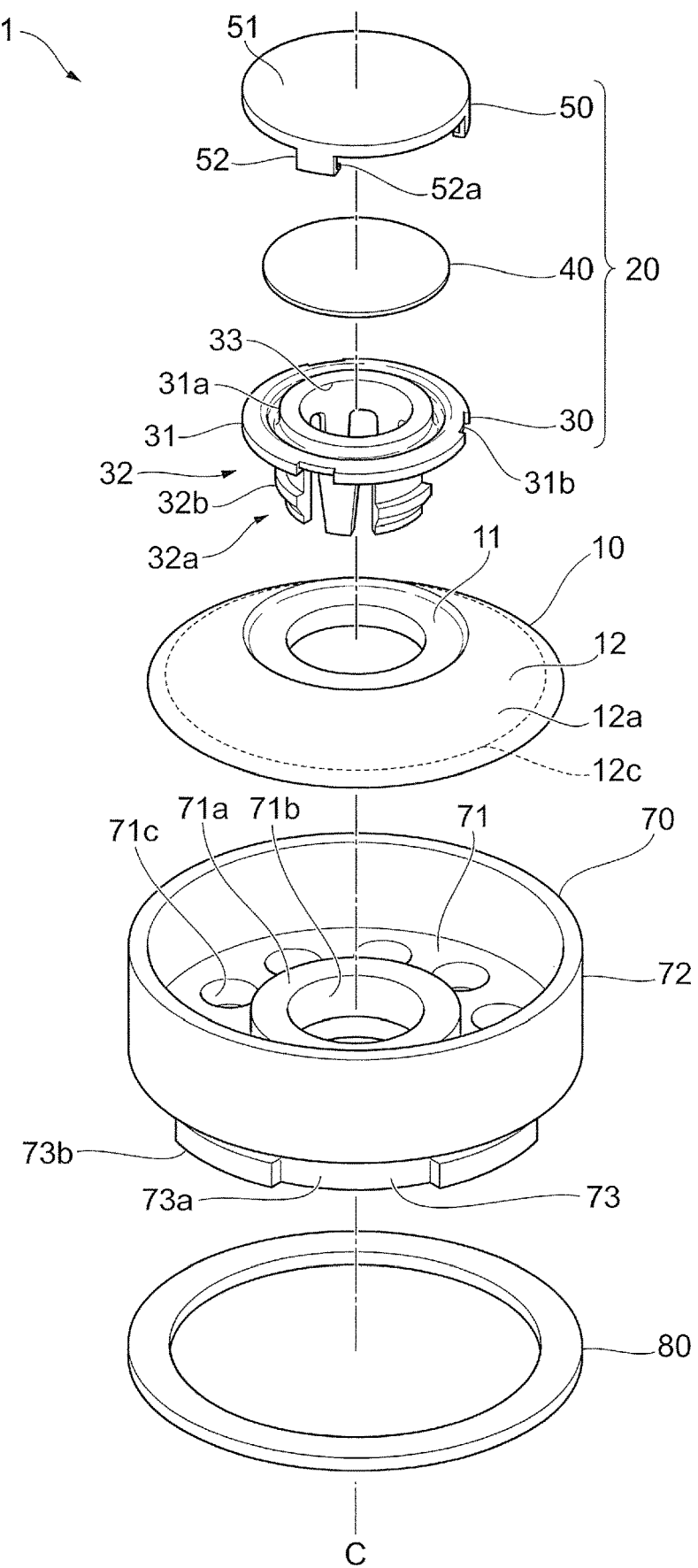
FIG. 4 is a perspective view of components constituting the ventilation unit related to the first exemplary embodiment.
Figure 5:
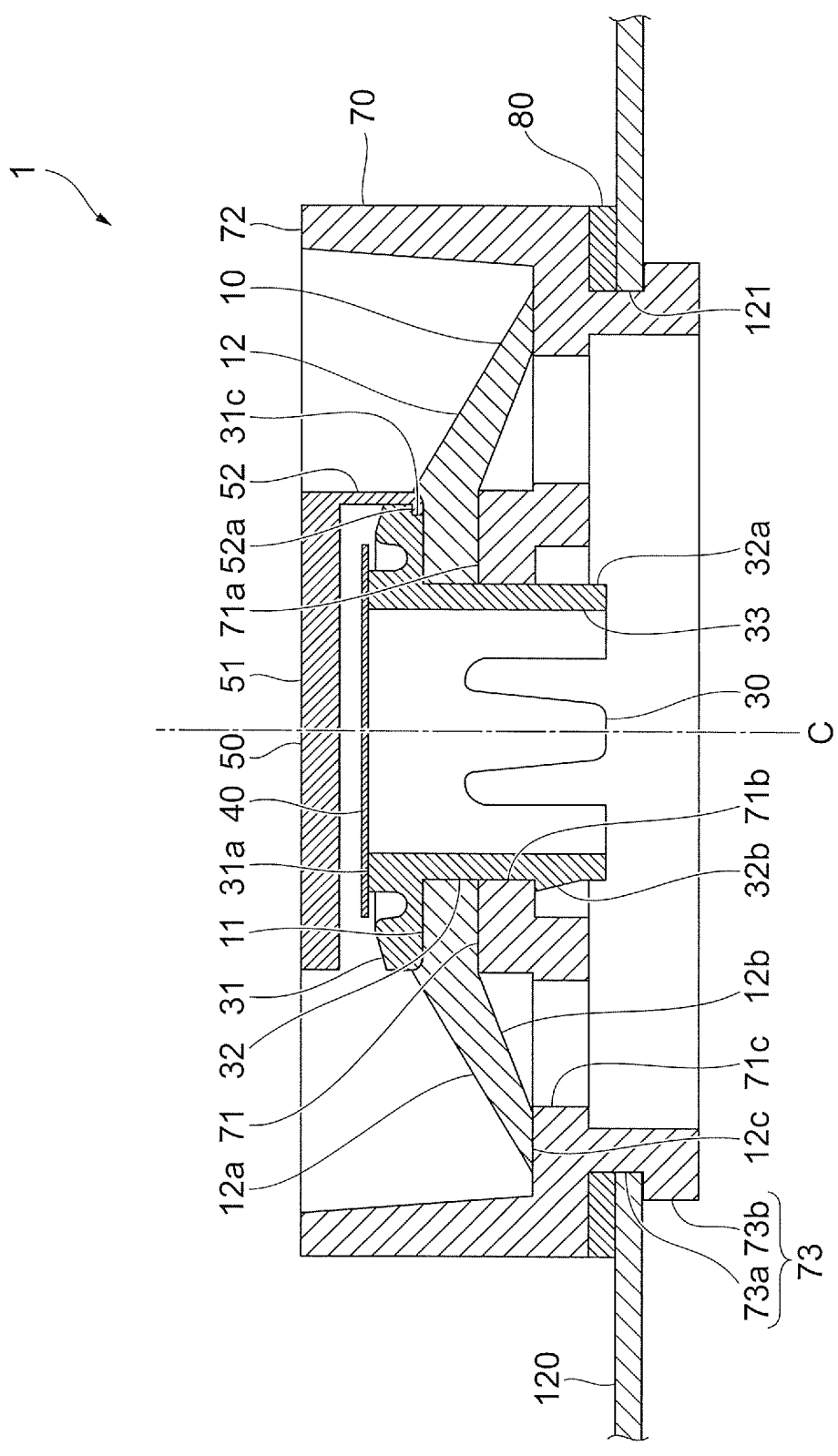
FIG. 5 is a cross-sectional view of the ventilation unit related to the first exemplary embodiment.

FIG. 3 is a perspective view showing the ventilation unit 1 related to the first exemplary embodiment. FIG. 4 is a perspective view of components constituting the ventilation unit 1 related to the first exemplary embodiment. FIG. 5 is a cross-sectional view of the ventilation unit 1 related to the first exemplary embodiment. Hereinafter, the upper side in each of FIGS. 3 to 5 is referred to as "upward," and the lower side thereof is referred to as "downward."

The ventilation unit 1 includes, as an example of a first ventilation body, an explosion-proof valve 10 that permits gas to flow from the inside of the housing 120 to the outside of the housing 120 when internal pressure, which is the pressure inside the housing 120 is higher than pressure outside the housing 120 (external pressure) by a value not less than a predetermined value, and blocks the flow of the gas from the inside of the housing 120 to the outside of the housing 120 when the internal pressure is not higher than the external pressure by a value not less than the predetermined value.

Moreover, the ventilation unit 1 includes an internal pressure adjusting component 20 that permits gas to flow between the inside of the housing 120 and the outside of the housing 120 when the pressure difference between the internal pressure and the external pressure is less than the predetermined value.

The ventilation unit 1 also includes: a holding member 70 that holds the internal pressure adjusting component 20 and is attached to the housing 120; and a sealing member 80 that is disposed between the holding member 70 and the housing 120 to seal the holding member 70 and the housing 120.

(Internal Pressure Adjusting Component 20)

The internal pressure adjusting component 20 includes a support body 30 as an example of a support member, which is attached to the holding member 70 and on which a communicating hole 33 for communicating the inside of the housing 120 with the outside of the housing 120 is formed.

Moreover, the internal pressure adjusting component 20 includes a ventilation membrane 40 as an example of a second ventilation body that is attached to the support body 30 to cover the communicating hole 33 to prevent liquids and solids from penetrating into the inside of the housing 120 from the outside of the housing 120 while permitting flow of gases between the inside of the housing 120 and the outside of the housing 120.

The internal pressure adjusting component 20 also includes a cover 50 that protects the ventilation membrane 40 from direct contact with high-pressure water and so forth.

<<Support Body 30>>

The support body 30 includes a support portion 31 for supporting the ventilation membrane 40 and an insertion portion 32 to be inserted into the holding member 70. At the center portion of the support body 30, the communicating hole 33 configured by a through hole that penetrates through the support portion 31 and the insertion portion 32 is formed.

The support portion 31 is a disk-shaped portion at a center portion of which the communicating hole 33 is formed. The outer diameter of the support portion 31 is larger than the outer diameter of the insertion portion 32. The support portion 31 includes, around the communicating hole 33, an annular-shaped supportive protruding part 31a that protrudes in a direction different from that of the insertion portion 32.

On an outer circumferential portion in the support portion 31, three linear parts 31b are provided at regular intervals in the circumferential direction. At a lower end portion of each of the linear parts 31b, a concave part 31c that is inwardly concaved is formed. An inward protruding part 52a of an extending portion 52, which will be described later, of the cover 50 is fitted into the concave part 31c, and thereby the support body 30 holds the cover 50.

The insertion portion 32 has a cylindrical shape having an outer diameter substantially the same as a center portion through hole 71b, which will be described later, formed in the holding member 70.

The insertion portion 32 includes, at a tip end portion thereof, which is on the side of starting to be inserted into the holding member 70, six leg portions 32a divided along the circumferential direction. Each of three leg portions 32a, of the six leg portions 32a, has an outward protruding part 32b that is protruded outwardly in the radial direction from the outer surface. The leg portions 32a provided with the outward protruding parts 32b and the leg portions 32a not provided with the outward protruding parts 32b are alternately disposed in the circumferential direction. The outward protruding parts 32b of the leg portions 32a are positioned below the center portion through hole 71b formed in the holding member 70 and are butted against a bottom portion 71, which will be described later, of the holding member 70, and thereby the support body 30 is prevented from detaching from the holding member 70.

As the material of the support body 30, though not particularly limited, a thermoplastic resin, which is easily molded, is preferred. As the thermoplastic resin, examples of thermoplastic resins except for elastomer can include polybutylene terephthalate (PBT), polyethylene terephthalate (PET), polyphenylene sulfide (PPS), polysulfone (PS), polypropylene (PP), polyethylene (PE), ABS resin or a composite material thereof. Moreover, the examples of the material of the support body 30 can include a composite material made by combining a reinforcement, such as glass fiber or carbon fiber, or metal with the thermoplastic resin to improve heat resistance, humidity resistance, dimensional stability, rigidity or the like.

The molding method of the support body 30 is not particularly limited; examples thereof can include injection molding, compression molding or cutting.

<<Ventilation Membrane 40>>

The ventilation membrane 40 is formed in a disk shape. The outer diameter of the ventilation membrane 40 is larger than the outer diameter of the supportive protruding part 31a of the support portion 31 in the support body 30. The ventilation membrane 40 is supported by the supportive protruding part 31a of the support portion 31 to cover the communicating hole 33. Examples of the supporting method can include joining by welding the ventilation membrane 40 to the supportive protruding part 31a. Other than this, ventilation membrane 40 and the supportive protruding part 31a may be bonded by a bonding agent or a double-faced tape. Moreover, the ventilation membrane 40 and the support body 30 may be integrated by insert molding. Alternatively, the ventilation membrane 40 may be swaged to the support body 30.

The material, the structure and the form of the ventilation membrane 40 are not particularly limited as long as a sufficient air permeable amount can be secured. Examples of the ventilation membrane 40 can include at least a kind selected from a fluorine resin porous body and a polyolefine porous body. As the fluorine resin, polytetrafluoroethylene (PTFE), polychlorotrifluoroethylene, tetrafluoroethylene-hexafluoropropylene copolymer, tetrafluoroethylene-perfluoroalkyl vinyl ether copolymer, tetrafluoroethylene-ethylene copolymer and so forth can be taken as examples. Examples of polyolefine monomers can include: ethylene; propylene; 4-methylpentene-1; and 1-butene, and polyolefine obtained by homopolymerizing or copolymerizing these monomers can be used. Moreover, the material may be obtained by blending at least two kinds of polyolefine, or may be a layer structure of at least two kinds of polyolefine. Of these, it is particularly preferable that the ventilation membrane 40 is made of a PTFE porous body that is able to maintain a ventilating property even with a small area and is highly functional to prevent entry of water or dust into the inside of the housing 120.

Note that a reinforcing material may be laminated to form a layer on at least one surface of the ventilation membrane 40. The material, the structure and the form of the reinforcing material are not particularly limited; however, a material having pore diameters larger than those of the ventilation membrane 40 and good ventilating properties, such as a woven cloth, a non-woven cloth, a mesh, a net, a sponge, a foam, a metal porous body or a metal mesh is suitable. When heat resistance is required, the reinforcing material made of polyester, polyamide, aramid resin, polyimide, fluoride resin, ultrahigh molecular weight polyethylene, metal or the like is preferred.

<<Cover 50>>

The cover 50 includes a disk-shaped top portion 51 and the extending portions 52 extending from an outermost circumferential part in the top portion 51 toward the support body 30.

The outer diameter of the top portion 51 is larger than the outer diameter of the ventilation membrane 40, and the top portion 51 covers the ventilation membrane 40 at a position via a predetermined interval from the ventilation membrane 40.

The extending portions 52 are formed at three locations at regular intervals in the circumferential direction. The extending portion 52 includes, at the end portion thereof on the support body 30 side, the inward protruding part 52a that protrudes inwardly. The inward protruding parts 52a are fitted into the concave parts 31c formed in the support portion 31 of the support body 30, and thereby the cover 50 is held by the support body 30. Gaps between the extending portions 52 function as a part of the flow path of gases communicating between the inside of the housing 120 and the outside of the housing 120.

The cover 50 is made of the same material as the support body 30, for example.

Note that the method of integrating the cover 50 and the support body 30 is not limited to the above-described method that fits the inward protruding parts 52*a* of the cover 50 into the concave parts 31*c* formed in the support body 30. For example, the cover 50 and the support body 30 may be integrated by thermal welding, ultrasonic welding, oscillatory welding, bonding using a bonding agent, threading or the like.

By covering the ventilation membrane 40 with the cover 50, the ventilation membrane 40 is prevented from being damaged by external forces, or ventilation is prevented from being blocked due to sand, mud and so forth piled on the surface of the ventilation membrane 40.

(Holding Member 70)

The holding member 70 includes: a disk-shaped bottom portion 71; a side portion 72 that protrudes upwardly in the centerline direction from the outermost circumferential part in the bottom portion 71 to be provided in the side direction of the ventilation membrane 40 of the internal pressure adjusting component 20 or the cover 50; and an attaching portion 73 that protrudes downwardly in the centerline direction from the outer circumferential part in the bottom portion 71 to be attached to the housing 120.

The bottom portion 71 includes, at the center portion thereof, a central protruding part 71*a* that protrudes upwardly in the centerline direction. At the center of the central protruding part 71*a*, the center portion through hole 71*b*, which is a through hole for holding the internal pressure adjusting component 20, is formed. The leg portions 32*a* of the insertion portion 32 in the support body 30 of the internal pressure adjusting component 20 are inserted into the center portion through hole 71*b*, and the plural outward protruding parts 32*b* of the leg portions 32*a* are spread out of the hole diameter of the center portion through hole 71*b* below thereof, and accordingly, the internal pressure adjusting component 20 is prevented from detaching from the holding member 70.

Moreover, in the bottom portion 71, plural through holes are formed around the central protruding part 71*a*. Hereinafter, the through holes formed around the central protruding part 71*a* are referred to as surrounding through holes 71*c*.

The side portion 72 is provided cylindrically to cover the ventilation membrane 40 of the internal pressure adjusting component 20 or the outer circumferential portion of the cover 50. An upper end surface of the side portion 72 functions as a butted surface (a butted portion) of a jig that inserts the internal pressure adjusting component 20 when the internal pressure adjusting component 20 is attached to the holding member 70. Therefore, the position of the upper end surface of the side portion 72 in the centerline direction is same as the position of the upper end surface of the cover 50 of the internal pressure adjusting component 20.

The attaching portion 73 includes a cylindrical part 73*a* in a cylinder shape and protruding parts 73*b* that protrudes outwardly from an outer circumferential surface of the cylindrical part 73*a*. The protruding parts 73*b* are formed at four locations at regular intervals in the circumferential direction at the lower end portion of the cylindrical part 73*a*.

In a state where the protruding parts 73*b* of the attaching portion 73 are positioned to face cutouts 121*a* formed in the housing 120, the cylindrical part 73*a* is inserted into an insertion hole 121 formed in the housing 120 and then rotated around the centerline at the position where the protruding part 73*b* enters the housing 120, and thereby the holding member 70 is fitted into the housing 120. Consequently, the ventilation unit 1 is attached to the housing 120.

Note that the method of attaching the ventilation unit 1 to the housing 120 is not particularly limited. For example, the holding member 70 may be press-fitted into the housing 120. Moreover, for example, a male thread is formed, instead of providing the protruding parts 73*b*, in the cylindrical part 73*a* of the attaching portion 73, and the ventilation unit 1 may be attached to the housing 120 by screwing the male thread into a female thread formed in the housing 120.

The material of the holding member 70 is harder than the material of the explosion-proof valve 10. For example, a thermoplastic resin, which is easily molded, or metal is preferred. As the thermoplastic resin, examples of thermoplastic resins except for elastomer can include polybutylene terephthalate (PBT), polyethylene terephthalate (PET), polyphenylene sulfide (PPS), polysulfone (PS), polypropylene (PP), polyethylene (PE), ABS resin or a composite material thereof. Moreover, the examples of the material of the holding member 70 can include a composite material made by combining a reinforcement, such as glass fiber or carbon fiber, or metal with the thermoplastic resin to improve heat resistance, humidity resistance, dimensional stability, rigidity or the like.

The molding method of the holding member 70 is not particularly limited; examples thereof can include injection molding, compression molding, die-casting or cutting. Moreover, the support body 30 may be molded by cutting after die-casting.

(Sealing Member 80)

The sealing member 80 is an annular-shaped rubber member. The inner diameter of the sealing member 80 is not less than the outer diameter of the cylindrical part 73*a* of the attaching portion 73 in the holding member 70, and the outer diameter of the sealing member 80 is equal to the outer diameter of the bottom portion 71 of the holding member 70. Then, when the holding member 70 is attached to the housing 120, the sealing member 80 is disposed between the holding member 70 and the housing 120 to seal the holding member 70 and the housing 120. In other words, between the holding member 70 and the housing 120, the sealing member 80 prevents liquids and solids from penetrating into the inside of the housing 120 from the outside of the housing 120 while blocking flow of gases between the inside of the housing 120 and the outside of the housing 120.

(Explosion-Proof Valve 10)

The explosion-proof valve 10 includes an annular portion 11 having an annular shape provided to the center, and an inclined portion 12 extending from an outer circumferential part of the annular portion 11 in a direction inclined with respect to the centerline direction and downwardly.

The inner diameter of the annular portion 11 is not more than the outer diameter of the insertion portion 32 of the support body 30, and the outer diameter of the annular portion 11 is larger than the outer diameter of the support portion 31 of the support body 30 or the outer diameter of the central protruding part 71*a* of the holding member 70. The annular portion 11 is press-fitted into the insertion portion 32 of the support body 30, and thereby the explosion-proof valve 10 is supported by the support body 30.

The inclined portion 12 extends from the whole circumference of the outer circumferential part of the annular portion 11 obliquely downward, and when viewed in FIG. 5, the inclined portion 12 includes an upper surface 12*a* positioned at the upper side, a lower surface 12*b* positioned at the lower side, and a contact surface 12*c* that intersects the centerline direction to be brought into contact with the bottom portion 71 of the holding member 70. The position where the contact surface 12*c* contacts a top surface of the bottom portion 71 of the holding member 70 is provided outside of the surrounding through holes 71c formed in the bottom portion 71. In other words, the radius from the centerline C in the contact surface 12c is larger than a distance from the centerline C to an outermost part of the surrounding through holes 71c.

In the explosion-proof valve 10, the annular portion 11 is sandwiched between the support portion 31 of the support body 30 and the central protruding part 71a of the bottom portion 71 in the holding member 70. Then, in the state where the annular portion 11 is sandwiched between the support portion 31 of the support body 30 and the central protruding part 71a of the holding member 70, the contact surface 12c is brought into contact with the top surface of the bottom portion 71 in the holding member 70. The contact surface 12c is brought into contact with a top surface of the bottom portion 71 of the holding member 70, and thereby a first flow path R1 (refer to FIG. 6), through which the gases communicate between the inside of the housing 120 and the outside of the housing 120 via the surrounding through holes 71c formed in the bottom portion 71 of the holding member 70, is closed.

The explosion-proof valve 10 is an elastic body, and examples of the material thereof can include a thermosetting elastomer or a thermosetting rubber that is not softened by heating within a certain range and has high heat resistance.

Then, the annular portion 11 is sandwiched between the support portion 31 of the support body 30 and the central protruding part 71a of the bottom portion 71 in the holding member 70, and thereby the explosion-proof valve 10 seals between the support body 30 and the holding member 70. In other words, between the support body 30 and the holding member 70, the explosion-proof valve 10 prevents liquids and solids from penetrating into the inside of the housing 120 from the outside of the housing 120 while blocking flow of gases between the inside of the housing 120 and the outside of the housing 120.

Figure 6:
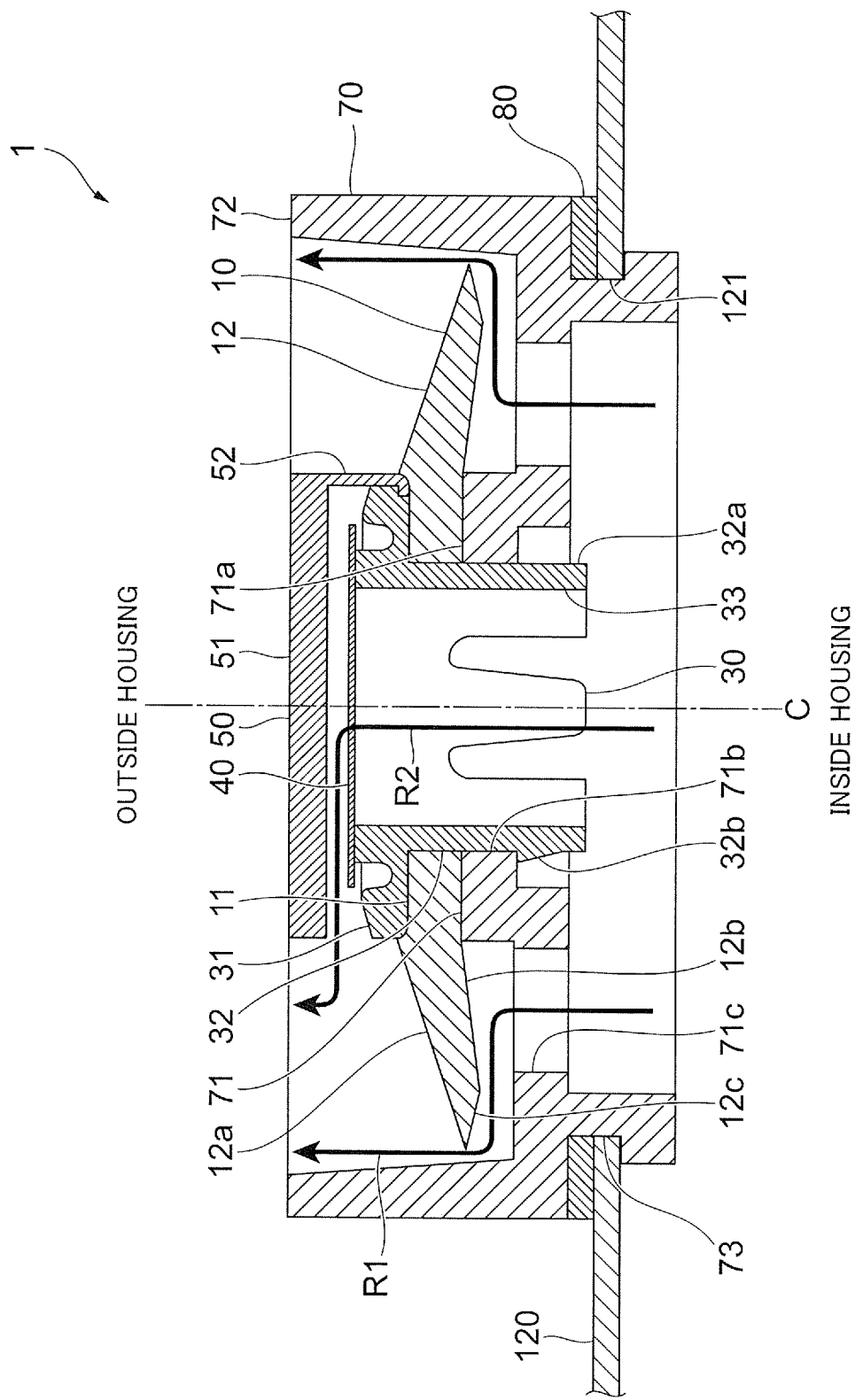
FIG. 6 is a diagram showing a state in which an explosion-proof valve related to the first exemplary embodiment opened a first flow path.

FIG. 6 is a diagram showing a state in which the explosion-proof valve 10 related to the first exemplary embodiment opened the first flow path R1.

The explosion-proof valve 10 is elastically deformed when the internal pressure, which is the pressure inside the housing 120, is higher than the external pressure, which is the pressure outside the housing 120, by a value not less than a predetermined value, and the contact surface 12c is separated from the bottom portion 71 of the holding member 70, to thereby open the first flow path R1.

To put it another way, when the pressure difference between the internal pressure and the external pressure is less than a predetermined value, the explosion-proof valve 10 closes the first flow path R1 by bringing the contact surface 12c into contact with the bottom portion 71 of the holding member 70. Then, the shape (the width between the upper surface 12a and the lower surface 12b) or material of the inclined portion 12 is determined so that, when the internal pressure is higher than the external pressure by a value not less than a predetermined value, elastic deformation is caused and the contact surface 12c is separated from the bottom portion 71 of the holding member 70, to thereby open the first flow path R1.

Note that, when the external pressure is higher than the internal pressure, the contact surface 12c is kept in contact with the bottom portion 71 of the holding member 70, and accordingly, the explosion-proof valve 10 continues to close the first flow path R1. Consequently, the explosion-proof valve 10 prevents liquids and solids from penetrating into the inside of the housing 120 from the outside of the housing 120, while blocking flow of gases between the inside of the housing 120 and the outside of the housing 120, via the first flow path R1.

(Action)

In the ventilation unit 1 configured as described above, when a pressure difference is generated between the pressure inside the housing 120 (internal pressure) and the pressure outside the housing 120 (external pressure), the pressure difference is eliminated by causing gases to communicate between the inside of the housing 120 and the outside of the housing 120 via the ventilation membrane 40. In other words, the flow paths configured with the communicating hole 33 formed in the support portion 31 of the support body 30 or the gaps between the extending portions 52 function as a second flow path R2 of gases communicating between the inside of the housing 120 and the outside of the housing 120. When the pressure difference is generated between the internal pressure and the external pressure, the pressure difference is eliminated by causing the gases to communicate through the second flow path R2 via the ventilation membrane 40.

If the pressure inside the housing 120 (the internal pressure) is rapidly increased, such as when abnormality occurs in the battery 110, the contact surface 12c of the explosion-proof valve 10 is separated from the bottom portion 71 of the holding member 70, and the explosion-proof valve 10 is elastically deformed to open the first flow path R1. Consequently, gases flow from the inside of the housing 120 to the outside of the housing 120 via the first flow path R1, and thereby the pressure difference between the pressure inside the housing 120 (the internal pressure) and the pressure outside the housing 120 (the external pressure) is eliminated.

(Assembly)

The ventilation unit 1 configured as described above is assembled as follows.

First, the ventilation membrane 40 is supported (for example, by welding) by the support body 30 of the internal pressure adjusting component 20, and the inward protruding parts 52a of the cover 50 are fitted into the concave parts 31c formed in the support body 30, and thereby the internal pressure adjusting component 20 is assembled. After the internal pressure adjusting component 20 is assembled, the annular portion 11 of the explosion-proof valve 10 is press-fitted into the insertion portion 32 of the support body 30 in the internal pressure adjusting component 20, to thereby integrate the internal pressure adjusting component 20 and the explosion-proof valve 10. Other than this, examples of the integrating method can include joining by welding the explosion-proof valve 10 to the support body 30 of the internal pressure adjusting component 20. Moreover, the explosion-proof valve 10 and the support body 30 of the internal pressure adjusting component 20 may be bonded by a bonding agent or a double-faced tape. In addition, the explosion-proof valve 10 and the support body 30 of the internal pressure adjusting component 20 may be integrated by insert molding. Then, the internal pressure adjusting component 20 supporting the explosion-proof valve 10 is inserted into the center portion through hole 71b formed in the bottom portion 71 of the holding member 70.

Figure 7A:
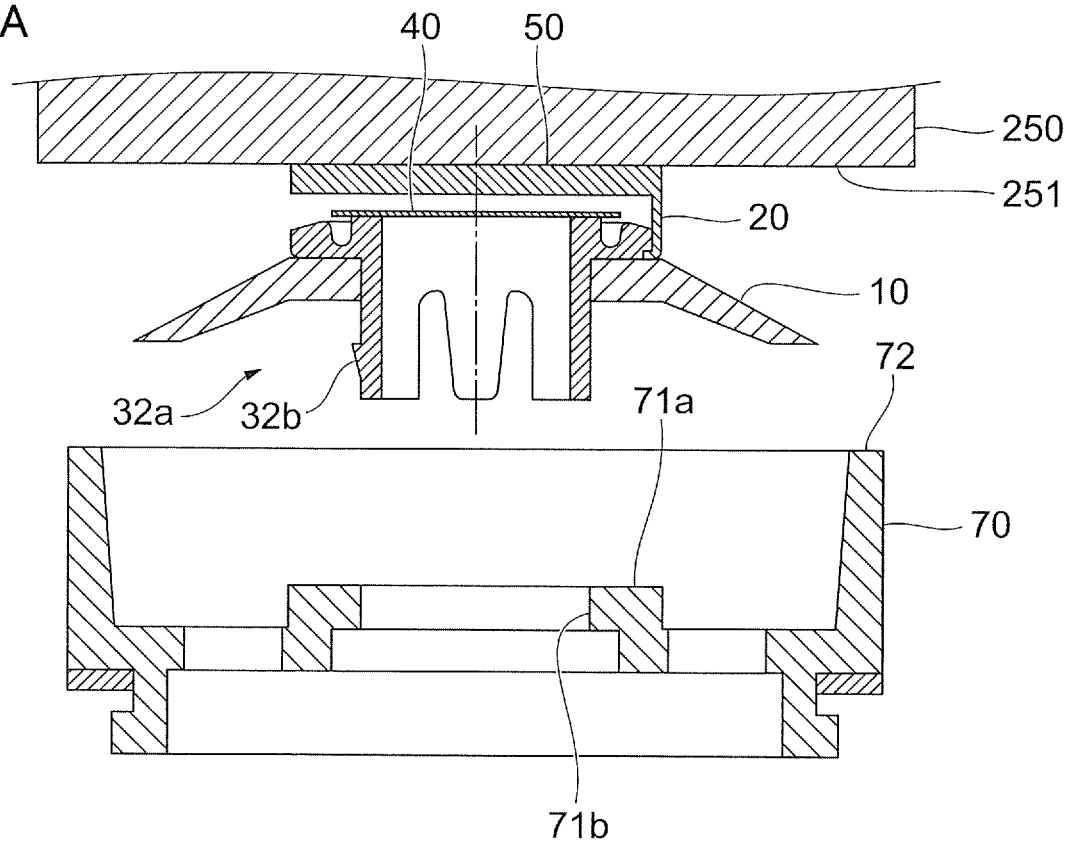
FIG. 7A is a diagram showing a state before an internal pressure adjusting component is inserted into a holding member.
Figure 7B:
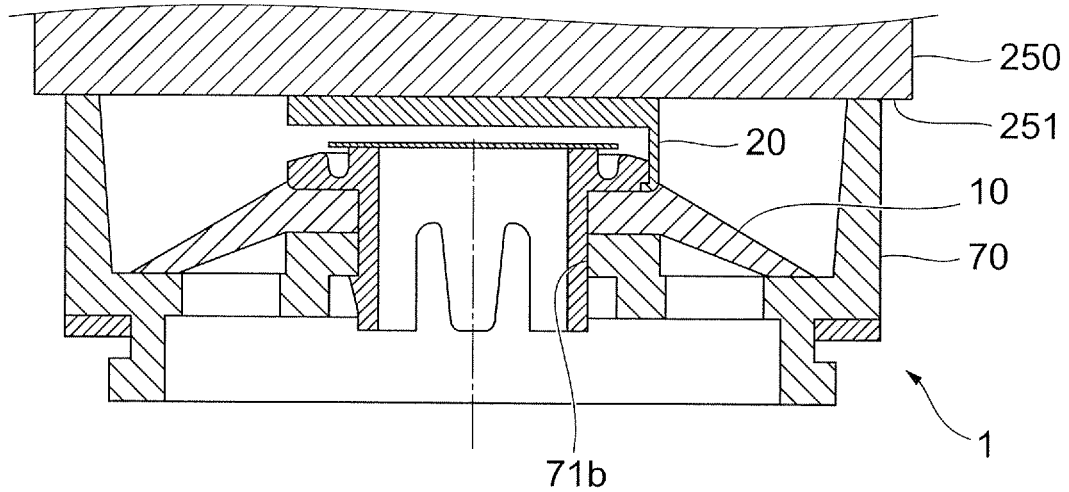
FIG. 7B is a diagram showing a state after the internal pressure adjusting component is inserted into the holding member.

FIG. 7A is a diagram showing a state before the internal pressure adjusting component 20 is inserted into the holding member 70. FIG. 7B is a diagram showing a state after the internal pressure adjusting component 20 is inserted into the holding member 70.

When the internal pressure adjusting component 20 is inserted into the center portion through hole 71b formed in the holding member 70, by a surface larger than the outer diameter of the side portion 72 of the holding member 70, for example, a jig 250 with a lower end surface 251, which is a circle having a diameter larger than the outer diameter of the side portion 72 of the holding member 70, the top portion 51 of the cover 50 in the internal pressure adjusting component 20 is pressurized. Then, as shown in FIG. 7B, the internal pressure adjusting component 20 is pressed into the holding member 70 until the lower end surface 251 of the jig 250 is butted against the side portion 72 of the holding member 70. Consequently, the outward protruding parts 32b of the leg portions 32a in the insertion portion 32 of the support body 30 are positioned below the center portion through hole 71b formed in the bottom portion 71 of the holding member 70. Then, the outward protruding parts 32b of the support body 30 are butted against the bottom portion 71 of the holding member 70, and thereby the internal pressure adjusting component 20 is prevented from detaching from the holding member 70.

(Inspection)

In the ventilation unit 1 related to the first exemplary embodiment, after the ventilation unit 1 is assembled, it is possible to easily inspect whether or not the explosion-proof valve 10 functions. In other words, it is possible to inspect the explosion-proof valve 10 that, when the pressure on the lower surface 12b side of the inclined portion 12 of the explosion-proof valve 10 is increased to be higher than the pressure on the upper surface 12a side of the inclined portion 12 by a value not less than a predetermined value, the contact surface 12c of the explosion-proof valve 10 is separated from the bottom portion 71 of the holding member 70 to open the first flow path R1.

For example, if the explosion-proof valve performs the opening operation with breaking or detaching of a part of components, the inspection of whether or not the explosion-proof valve functions accompanies actual breaking or detaching; therefore, the inspection cannot be performed easily. For example, it is difficult to deal with those broken by the inspection as products.

In contrast thereto, in the ventilation unit 1 related to the exemplary embodiment, the explosion-proof valve 10 is elastically deformed to separate the contact surface 12c from the bottom portion 71 of the holding member 70, and thereby the first flow path R1 is opened. Therefore, since the contact surface 12c contacts the bottom portion 71 of the holding member 70 to close the first flow path R1 after the inspection is completed, the ventilation unit 1 can be used as a product after inspection.

Figure 8:
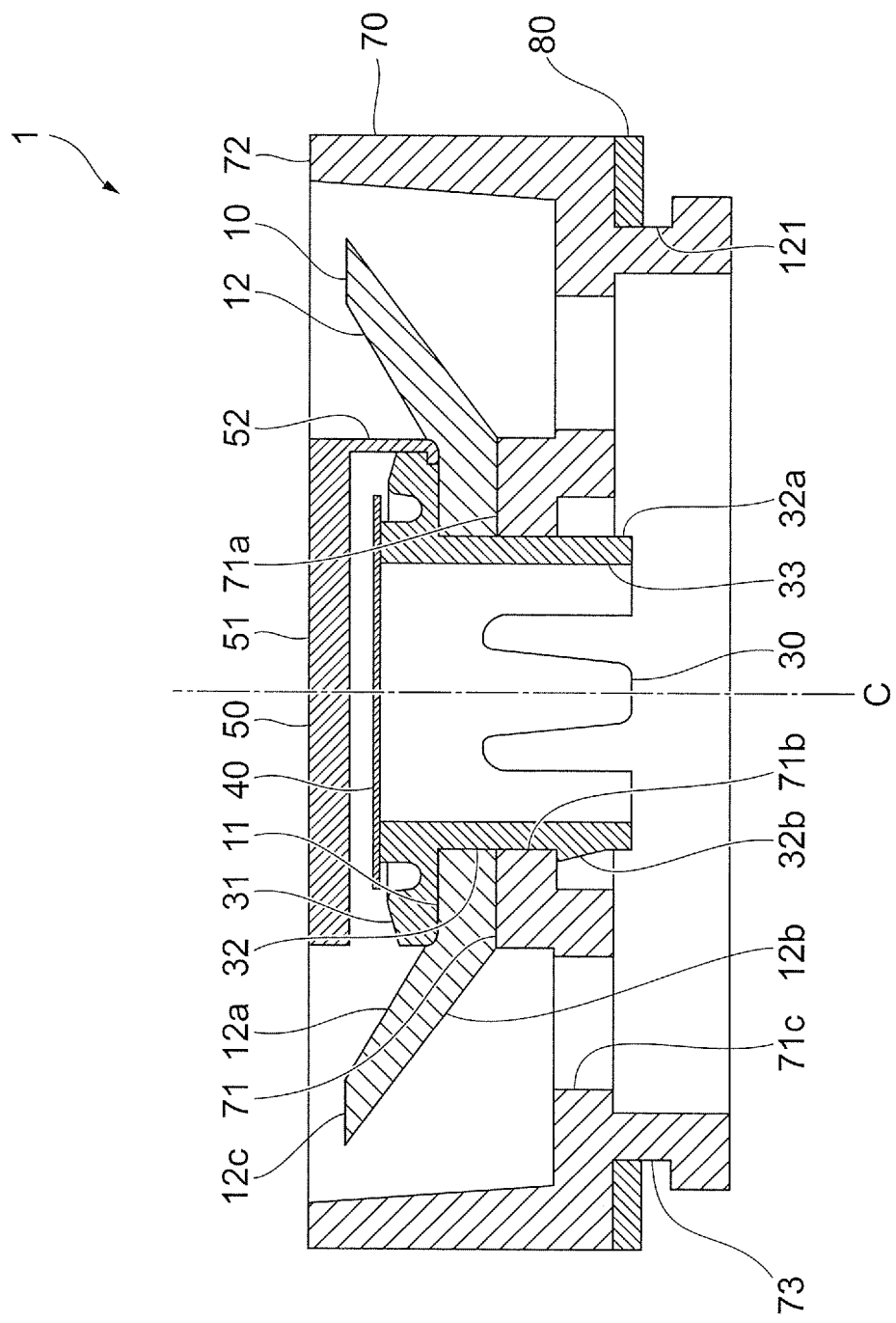
FIG. 8 is a diagram showing an example of a state after a function of the explosion-proof valve related to the first exemplary embodiment was inspected.

FIG. 8 is a diagram showing an example of a state after the function of the explosion-proof valve 10 related to the first exemplary embodiment was inspected. In the state shown in FIG. 8, the inclined portion 12 is deformed so that the upper surface 12a and the lower surface 12b are reversed with respect to the annular portion 11 as a fulcrum (the upper surface 12a is positioned inside (the centerline C side) and the lower surface 12b is positioned outside).

Even though the deformation in the state shown in FIG. 8 is achieved by increasing the pressure on the lower surface 12b side of the inclined portion 12 of the explosion-proof valve 10 to be higher than the pressure on the upper surface 12a side of the inclined portion 12 by a value not less than a predetermined value, the contact surface 12c can be returned again to contact the bottom portion 71 of the holding member 70, to thereby close the first flow path R1, because the material of the explosion-proof valve 10 is the thermosetting elastomer or the thermosetting rubber. Also, from this, according to the ventilation unit 1 related to the first exemplary embodiment, it is possible to easily inspect whether or not the explosion-proof valve 10 functions after the ventilation unit 1 has been assembled, as compared to the case where, for example, the explosion-proof valve performs the opening operation with breaking or detaching of a part of components.

Note that, in the above-described first exemplary embodiment, the mode in which the internal pressure adjusting component 20 and the explosion-proof valve 10 are integrated is taken as an example; however, the present invention is not particularly limited to such a mode. For example, the internal pressure adjusting component 20 and the explosion-proof valve 10 may be separately assembled to the holding member 70 in a state not to be integrated. Even in such a case, it is desirable that, when the internal pressure adjusting component 20 is attached to the holding member 70, the annular portion 11 of the explosion-proof valve 10 is sandwiched between the internal pressure adjusting component 20 and the holding member 70 in the state of being compressed therebetween to seal between the internal pressure adjusting component 20 and the holding member 70.

Second Exemplary Embodiment

Figure 9:
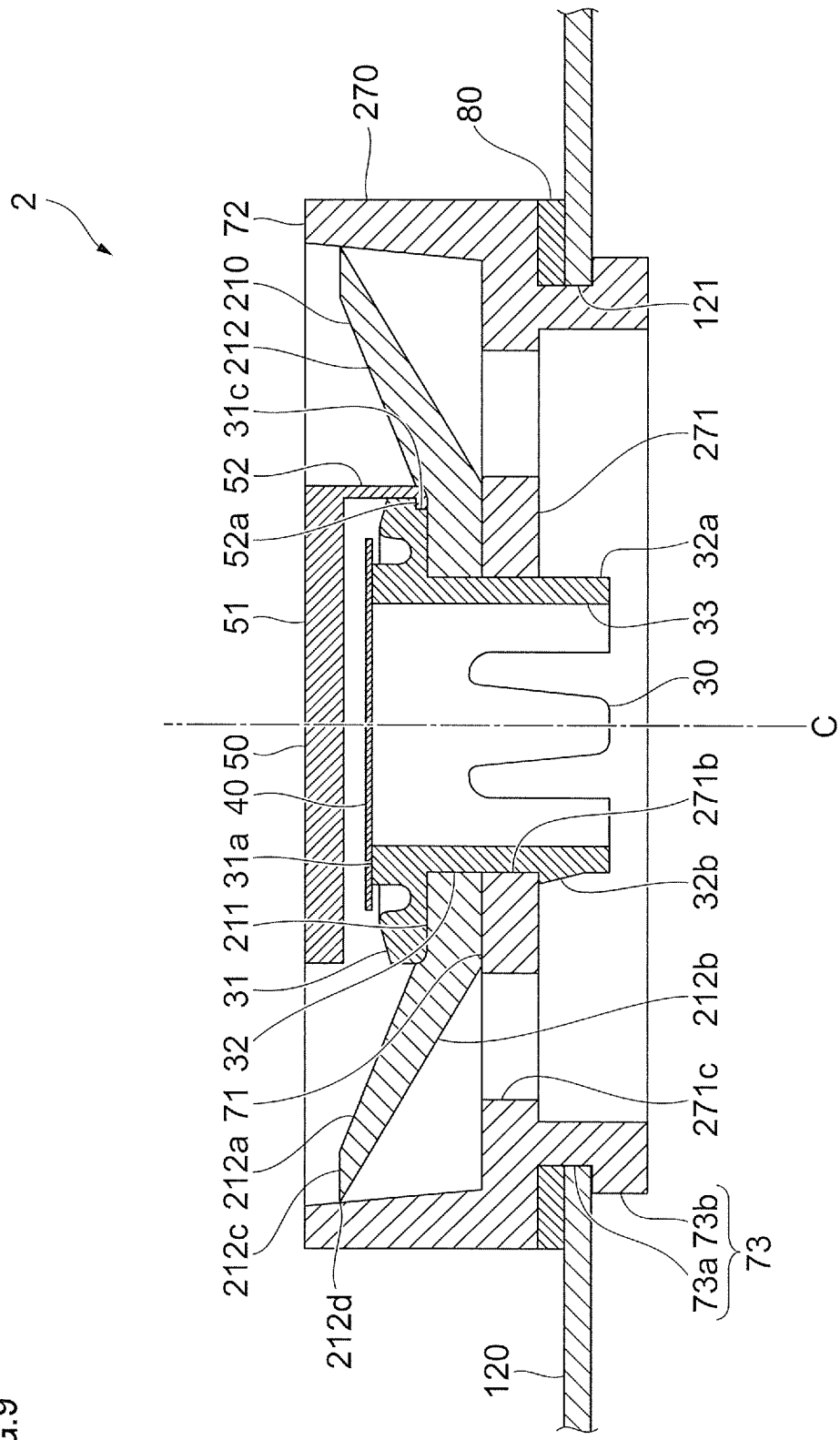
FIG. 9 is a cross-sectional view of a ventilation unit related to a second exemplary embodiment.

FIG. 9 is a cross-sectional view of a ventilation unit 2 related to a second exemplary embodiment.

The ventilation unit 2 related to the second exemplary embodiment is different from the ventilation unit 1 related to the first exemplary embodiment in the explosion-proof valve 10 and the holding member 70. Hereinafter, with respect to the ventilation unit 2 related to the second exemplary embodiment, points different from those of the ventilation unit 1 related to the first exemplary embodiment will be described, but points same as those of the ventilation unit 1 related to the first exemplary embodiment will be assigned with the same signs and detailed description thereof will be omitted.

The ventilation unit 2 related to the second exemplary embodiment includes an explosion-proof valve 210 and a holding member 270.

(Holding Member 270)

The holding member 270 includes a disk-shaped bottom portion 271, the side portion 72 and the attaching portion 73.

The bottom portion 271 related to the second exemplary embodiment is different from the bottom portion 71 related to the first exemplary embodiment in the point that the bottom portion 271 is not provided with the central protruding part 71a upwardly protruding at the center portion. Then, in the bottom portion 271 related to the second exemplary embodiment, a center portion through hole 271b, which is a through hole for holding the internal pressure adjusting component 20, is formed. The leg portions 32a of the insertion portion 32 in the support body 30 of the internal pressure adjusting component 20 are inserted into the center portion through hole 271b, and the plural outward protruding parts 32b of the leg portions 32a are spread out of the hole diameter of the center portion through hole 271b below thereof, and accordingly, the internal pressure adjusting component 20 is prevented from detaching from the holding member 270.

Moreover, in the bottom portion 271, plural through holes are formed around the center portion through hole 271b. Hereinafter, the through holes formed around the center portion through hole 271b are referred to as surrounding through holes 271c.

(Explosion-Proof Valve 210)

The explosion-proof valve 210 related to the second exemplary embodiment includes an annular portion 211 having an annular shape provided to the center, and an inclined portion 212 extending from an outer circumferential part of the annular portion 211 in a direction inclined with respect to the centerline direction and upwardly.

The inner diameter of the annular portion 211 is not more than the outer diameter of the insertion portion 32 of the support body 30, and the outer diameter of the annular portion 211 is set to be positioned inside the surrounding through holes 271c formed in the holding member 270.

The inclined portion 212 extends from the whole circumference of the outer circumferential part of the annular portion 211 obliquely upward, and when viewed in FIG. 9, the inclined portion 212 includes an upper surface 212a positioned at the upper side, a lower surface 212b positioned at the lower side, and an intersecting surface 212c that intersects the centerline direction.

In the explosion-proof valve 210, the annular portion 211 is sandwiched between the support portion 31 of the support body 30 and the bottom portion 271 of the holding member 270. In the state where the annular portion 211 is sandwiched between the support portion 31 of the support body 30 and the holding member 270, an intersecting line 212d of the lower surface 212b and the intersecting surface 212c contacts the inner circumferential surface of the side portion 72 of the holding member 270, and thereby the first flow path R1, through which the gases communicate between the inside of the housing 120 and the outside of the housing 120 via the surrounding through holes 271c formed in the bottom portion 271 of the holding member 270, is closed.

Figure 10:
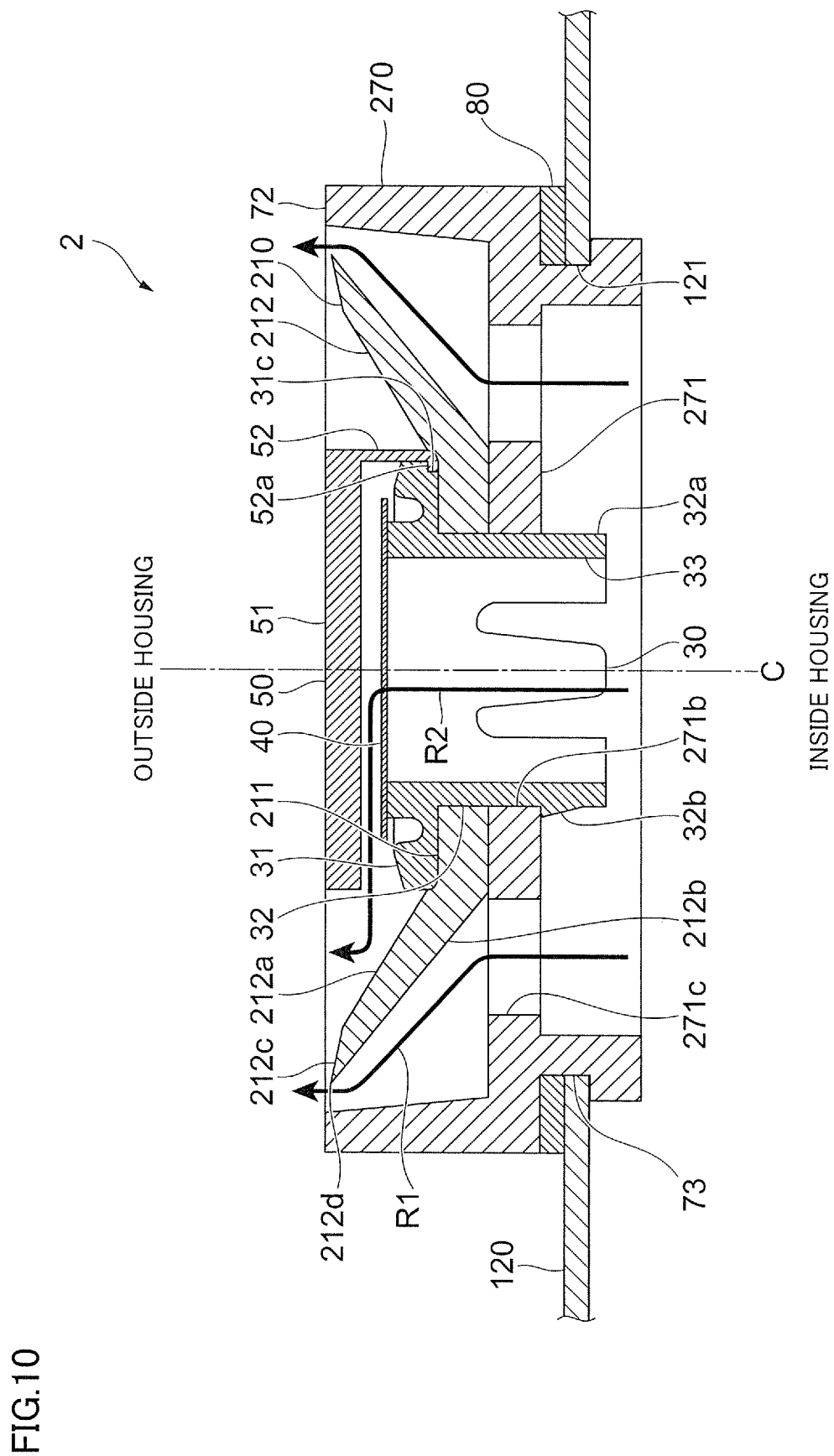
FIG. 10 is a diagram showing a state in which an explosion-proof valve related to the second exemplary embodiment opened the first flow path.

FIG. 10 is a diagram showing a state in which the explosion-proof valve 210 related to the second exemplary embodiment opened the first flow path R1.

The explosion-proof valve 210 is elastically deformed when the internal pressure, which is the pressure inside the housing 120, is higher than the external pressure, which is the pressure outside the housing 120, by a value not less than a predetermined value, and the intersecting line 212d is separated from the side portion 72 of the holding member 270, to thereby open the first flow path R1.

To put it another way, when the pressure difference between the internal pressure and the external pressure is less than a predetermined value, the explosion-proof valve 210 closes the first flow path R1 by bringing the intersecting line 212d into contact with the side portion 72 of the holding member 270. Then, the shape (the width between the upper surface 212a and the lower surface 212b) or material of the inclined portion 212 is determined so that, when the internal pressure is higher than the external pressure by a value not less than a predetermined value, elastic deformation is caused and the intersecting line 212d is separated from the side portion 72 of the holding member 270, to thereby open the first flow path R1.

Note that, when the external pressure is higher than the internal pressure, the intersecting line 212d is kept in contact with the side portion 72 of the holding member 270, and accordingly, the explosion-proof valve 210 continues to close the first flow path R1. Consequently, the explosion-proof valve 210 prevents liquids and solids from penetrating into the inside of the housing 120 from the outside of the housing 120, while blocking flow of gases between the inside of the housing 120 and the outside of the housing 120, via the first flow path R1.

(Action)

In the ventilation unit 2 related to the second exemplary embodiment configured as described above, when a pressure difference is generated between the pressure inside the housing 120 (internal pressure) and the pressure outside the housing 120 (external pressure), the pressure difference is eliminated by causing gases to communicate between the inside of the housing 120 and the outside of the housing 120 via the ventilation membrane 40.

If the pressure inside the housing 120 (the internal pressure) is rapidly increased, such as when abnormality occurs in the battery 110, the intersecting line 212d of the explosion-proof valve 210 is separated from the side portion 72 of the holding member 270, and the explosion-proof valve 210 is elastically deformed to open the first flow path R1. Consequently, gases flow from the inside of the housing 120 to the outside of the housing 120 via the first flow path R1, and thereby the pressure difference between the pressure inside the housing 120 (the internal pressure) and the pressure outside the housing 120 (the external pressure) is eliminated.

(Assembly)

The ventilation unit 2 related to the second exemplary embodiment configured as described above is assembled as follows.

First, the internal pressure adjusting component 20 is assembled as described above, and thereafter, the annular portion 211 of the explosion-proof valve 210 is press-fitted into the insertion portion 32 of the support body 30 in the internal pressure adjusting component 20. Then, the internal pressure adjusting component 20 supporting the explosion-proof valve 210 is inserted into the center portion through hole 271b formed in the bottom portion 271 of the holding member 270.

When the internal pressure adjusting component 20 is inserted into the center portion through hole 271b formed in the holding member 270, the top portion 51 of the cover 50 in the internal pressure adjusting component 20 is pressurized by the jig 250. Then, the internal pressure adjusting component 20 is pressed into the holding member 270 until the lower end surface 251 of the jig 250 is butted against the side portion 72 of the holding member 270. Consequently, the outward protruding parts 32b of the leg portions 32a in the insertion portion 32 of the support body 30 are positioned below the center portion through hole 271b formed in the bottom portion 271 of the holding member 270. Then, the outward protruding parts 32b of the support body 30 are butted against the bottom portion 271 of the holding member 270, and thereby the internal pressure adjusting component 20 is prevented from detaching from the holding member 270.

(Inspection)

In the ventilation unit 2 related to the second exemplary embodiment, after the ventilation unit 2 is assembled, it is possible to easily inspect whether or not the explosion-proof valve 210 functions. In other words, it is possible to inspect the explosion-proof valve 210 that, when the pressure on the lower surface 212b side of the inclined portion 212 of the explosion-proof valve 210 is increased to be higher than the pressure on the upper surface 212a side of the inclined portion 212 by a value not less than a predetermined value, the intersecting line 212d of the explosion-proof valve 210 is separated from the side portion 72 of the holding member 270 to open the first flow path R1. Then, in the ventilation unit 2 related to the second exemplary embodiment, since the intersecting line 212d contacts the side portion 72 of the holding member 270 to close the first flow path R1 after the inspection is completed, the ventilation unit 2 can be used as a product after inspection. Therefore, according to the ventilation unit 2 related to the second exemplary embodiment, it is possible to easily inspect whether or not the explosion-proof valve 210 functions after the ventilation unit 2 has been assembled, as compared to the case where, for example, the explosion-proof valve performs the opening operation with breaking or detaching of a part of components.

Note that the shape of the inclined portion 212 of the explosion-proof valve 10 is not particularly limited as long as capable of contacting the side portion 72 of the holding member 720. For example, the inclined portion 212 may include the upper surface 212a positioned at the upper side, the lower surface 212b positioned at the lower side, and a surface to be brought into surface contact with the inner circumferential surface of the side portion 72 when the inclined portion 212 contacts the side portion 72 of the holding member 270, for instance, a surface in parallel with the centerline direction.

Third Exemplary Embodiment

Figure 11:
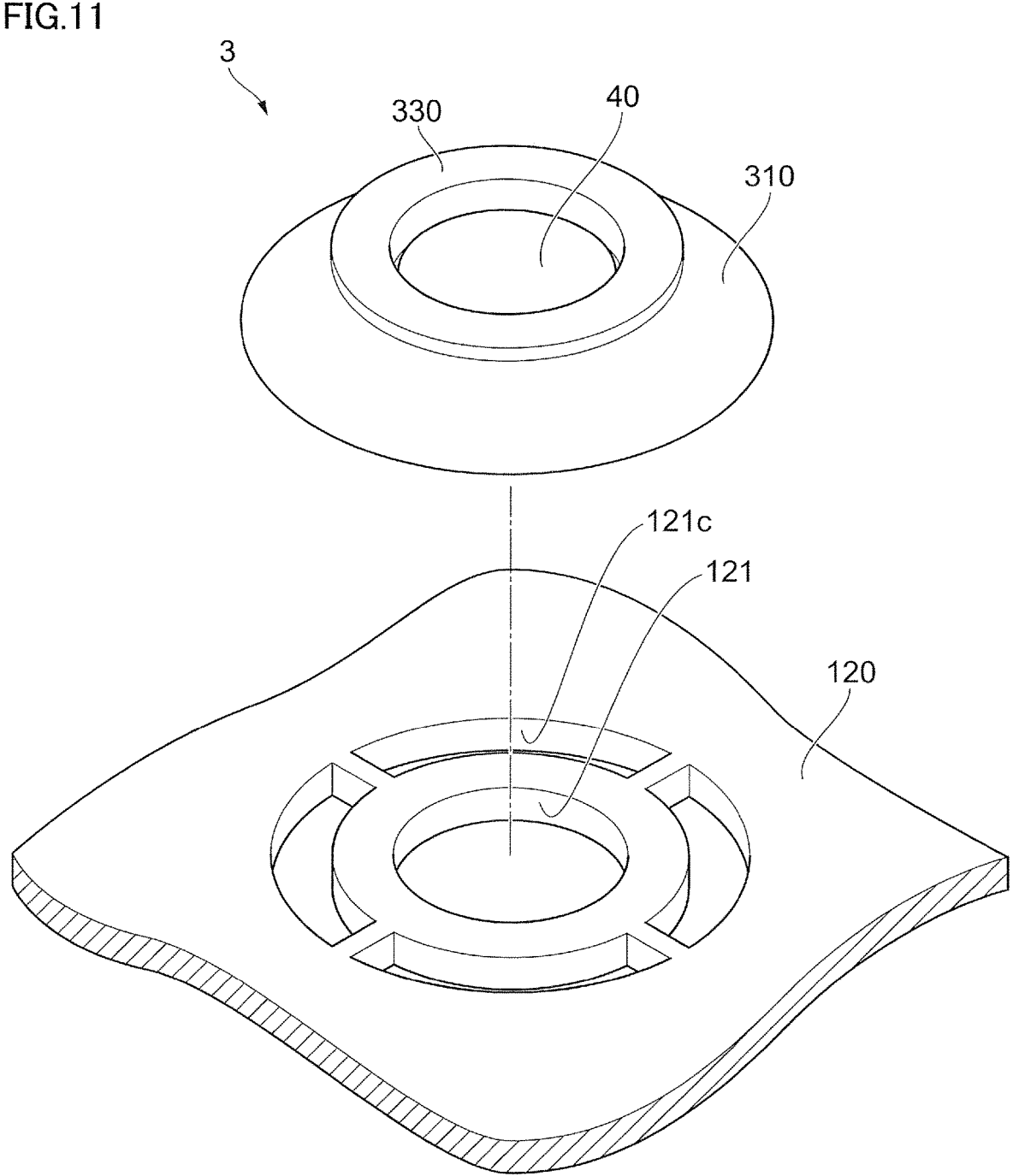
FIG. 11 is a perspective view of components constituting a ventilation unit related to a third exemplary embodiment.
Figure 12:
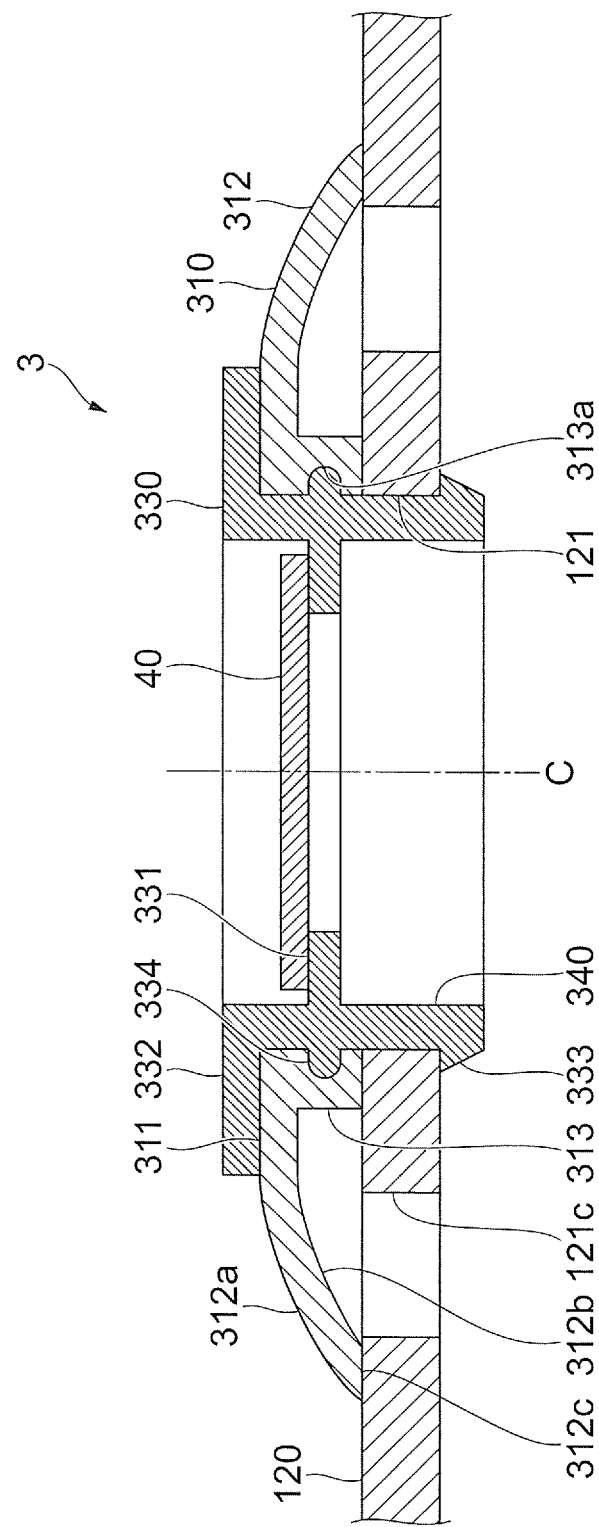
FIG. 12 is a cross-sectional view of the ventilation unit related to the third exemplary embodiment.

FIG. 11 is a perspective view of components constituting the ventilation unit 3 related to the third exemplary embodiment. FIG. 12 is a cross-sectional view of the ventilation unit 3 related to the third exemplary embodiment.

Hereinafter, with respect to the ventilation unit 3 related to the third exemplary embodiment, points different from those of the ventilation unit 1 related to the first exemplary embodiment will be described, but points same as those of the ventilation unit 1 related to the first exemplary embodiment will be assigned with the same signs and detailed description thereof will be omitted.

The ventilation unit 3 related to the third exemplary embodiment includes an explosion-proof valve 310 that permits gases to flow from the inside of the housing 120 to the outside of the housing 120 when internal pressure, which is the pressure inside the housing 120 is higher than pressure outside the housing 120 (external pressure) by a value not less than a predetermined value, and blocks the flow of the gases from the inside of the housing 120 to the outside of the housing 120 when the internal pressure is not higher than the external pressure by a value not less than the predetermined value.

Moreover, the ventilation unit 3 includes the ventilation membrane 40 that prevents liquids and solids from penetrating into the inside of the housing 120 from the outside of the housing 120 while permitting flow of gases between the inside of the housing 120 and the outside of the housing 120.

Moreover, the ventilation unit 3 includes a support body 330 that supports the ventilation membrane 40 and the explosion-proof valve 310, while having a communicating hole 340 formed therein to communicate the inside of the housing 120 and the outside of the housing 120 and being inserted into the insertion hole 121 formed in the housing 120.

(Support Body 330)

The support body 330 is a cylinder-shaped member, and the outer diameter thereof is not more than the hole diameter of the insertion hole 121 formed in the housing 120. The support body 330 includes an inward protruding portion 331 that protrudes inwardly from the inner circumferential surface over the whole circumference. Moreover, the support body 330 includes: an upper end outward protruding portion 332 that protrudes outwardly from the outer circumferential surface at the upper end portion; a lower end outward protruding portion 333 that protrudes outwardly from the outer circumferential surface at the lower end portion; and a middle-stage outward protruding portion 334 that protrudes outwardly from the outer circumferential surface between the upper end outward protruding portion 332 and the lower end outward protruding portion 333.

The ventilation membrane 40 is supported by inward protruding portion 331 of the support body 330 to cover the communicating hole 340. Examples of the supporting method can include joining by welding the ventilation membrane 40 to the inward protruding portion 331. Other than this, ventilation membrane 40 and the inward protruding portion 331 may be bonded by a bonding agent or a double-faced tape. Moreover, the ventilation membrane 40 and the support body 330 may be integrated by insert molding. Alternatively, the ventilation membrane 40 may be swaged to the support body 330.

When the ventilation unit 3 is attached to the housing 120, the lower end outward protruding portion 333 is positioned beneath the insertion hole 121 formed in the housing 120, and the lower end outward protruding portion 333 is butted against the housing 120, to thereby prevent the ventilation unit 3 from detaching from the housing 120.

The middle-stage outward protruding portion 334 is fitted into a concave part 313a, which will be described later, of the explosion-proof valve 310 to support the explosion-proof valve 310.

(Explosion-Proof Valve 310)

The explosion-proof valve 310 includes an annular portion 311 having an annular shape provided to the center, an inclined portion 312 extending from an outer circumferential part of the annular portion 311 in a direction inclined with respect to the centerline direction and downwardly, and a downward protruding portion 313 protruding downward from an inside end portion in the annular portion 311.

In the downward protruding portion 313, the concave part 313a having a cylindrical shape and concaved outwardly from the inner circumferential surface is formed.

The inner diameter of the annular portion 311 and the downward protruding portion 313 is not more than the outer diameter of the support body 330, and the explosion-proof valve 310 is press-fitted over the outer circumferential surface of the support body 330, and thereby supported by the support body 330. Then, the middle-stage outward protruding portion 334 of the support body 330 is fitted into the concave part 313a of the downward protruding portion 313, and thereby the position of the explosion-proof valve 310 in the centerline direction is determined.

The inclined portion 312 extends from the whole circumference of the outer circumferential part of the annular portion 311 obliquely downward, and when viewed in FIG. 12, the inclined portion 312 includes an upper surface 312a positioned at the upper side, a lower surface 312b positioned at the lower side, and a contact surface 312c that intersects the centerline direction to be brought into contact with an outer surface of the housing 120. The position where the contact surface 312c contacts the outer surface of the housing 120 is provided outside of the surrounding through holes 121c formed around the insertion hole 121 of the housing 120. In other words, when the ventilation unit 3 is attached to the housing 120, the radius from the centerline C in the contact surface 312c is larger than a distance from the centerline C to an outermost part of the surrounding through holes 121c.

In the explosion-proof valve 310, the annular portion 311 and the downward protruding portion 313 are sandwiched between the upper end outward protruding portion 332 of the support body 330 and the housing 120. Then, in the state where the annular portion 311 and the downward protruding portion 313 are sandwiched between the upper end outward protruding portion 332 of the support body 330 and the housing 120, the contact surface 312c is brought into contact with the outer surface of the housing 120. The contact surface 312c is brought into contact with the outer surface of the housing 120, and thereby the first flow path R1, through which the gases communicate between the inside of the housing 120 and the outside of the housing 120 via the surrounding through holes 121c formed in the housing 120, is closed.

The explosion-proof valve 310 is an elastic body, and examples of the material thereof can include a thermosetting elastomer or a thermosetting rubber that is not softened by heating within a certain range and has high heat resistance.

Then, the annular portion 311 and the downward protruding portion 313 are sandwiched between the upper end outward protruding portion 332 of the support body 330 and the housing 120, and thereby the explosion-proof valve 310 seals between the support body 330 and the housing 120. In other words, between the outer surface of the support body 330 and the housing 120, the explosion-proof valve 310 prevents liquids and solids from penetrating into the inside of the housing 120 from the outside of the housing 120 while blocking flow of gases between the inside of the housing 120 and the outside of the housing 120.

Figure 13:
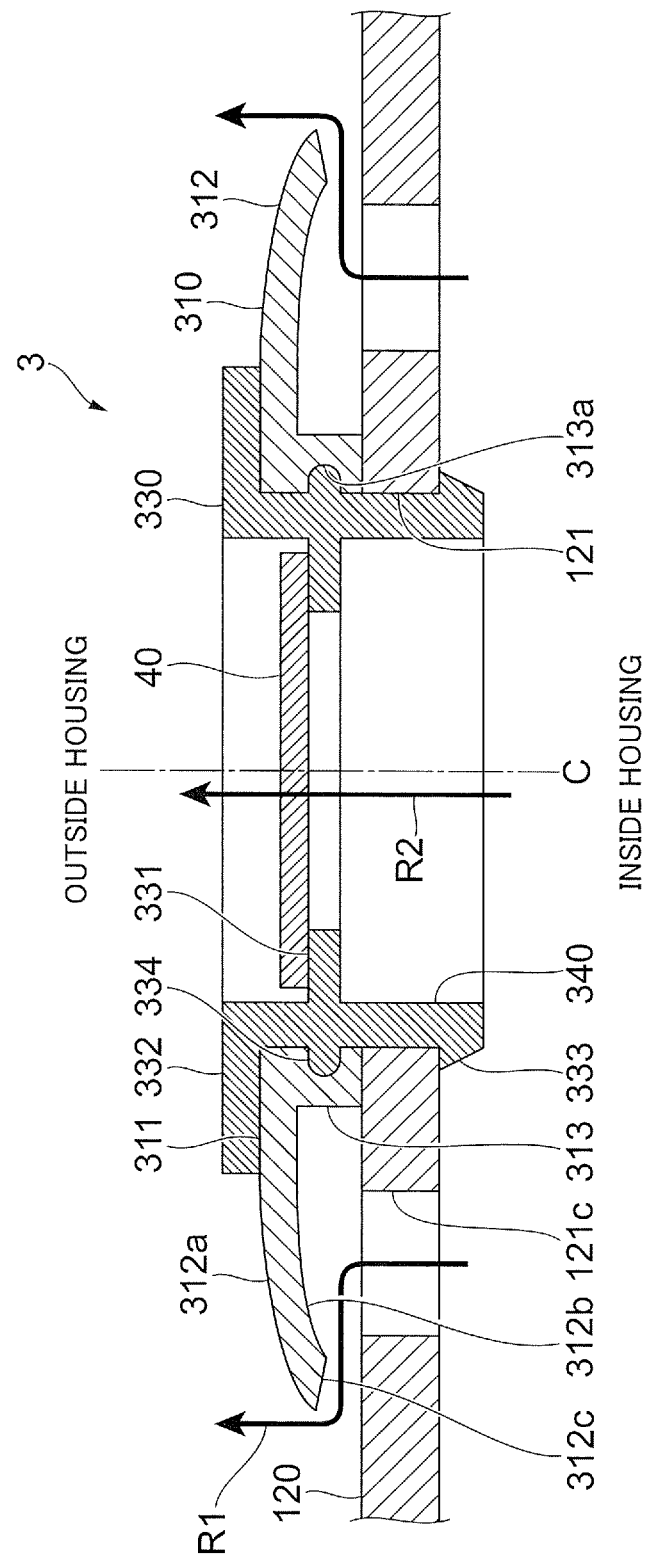
FIG. 13 is a diagram showing a state in which an explosion-proof valve related to the third exemplary embodiment opened the first flow path.

FIG. 13 is a diagram showing a state in which the explosion-proof valve 310 related to the third exemplary embodiment opened the first flow path R1.

The explosion-proof valve 310 is elastically deformed when the internal pressure, which is the pressure inside the housing 120, is higher than the external pressure, which is the pressure outside the housing 120, by a value not less than a predetermined value, and the contact surface 312c is separated from the outer surface of the housing 120, to thereby open the first flow path R1.

To put it another way, when the pressure difference between the internal pressure and the external pressure is less than a predetermined value, the explosion-proof valve 310 closes the first flow path R1 by bringing the contact surface 312c into contact with the outer surface of the housing 120. Then, the shape (the width between the upper surface 312a and the lower surface 312b) or material of the inclined portion 312 is determined so that, when the internal pressure is higher than the external pressure by a value not less than a predetermined value, elastic deformation is caused and the contact surface 312c is separated from the outer surface of the housing 120, to thereby open the first flow path R1.

Note that, when the external pressure is higher than the internal pressure, the contact surface 312c is kept in contact with the outer surface of the housing 120, and accordingly, the explosion-proof valve 310 continues to close the first flow path R1. Consequently, the explosion-proof valve 310 prevents liquids and solids from penetrating into the inside of the housing 120 from the outside of the housing 120, while blocking flow of gases between the inside of the housing 120 and the outside of the housing 120, via the first flow path R1.

(Action)

In the ventilation unit 3 configured as described above, when a pressure difference is generated between the pressure inside the housing 120 (internal pressure) and the pressure outside the housing 120 (external pressure), the pressure difference is eliminated by causing gases to communicate between the inside of the housing 120 and the outside of the housing 120 via the ventilation membrane 40. In other words, the flow paths configured with the communicating hole 340 formed in the support body 330 and so forth function as a second flow path R2 of gases communicating between the inside of the housing 120 and the outside of the housing 120. When the pressure difference is generated between the internal pressure and the external pressure, the pressure difference is eliminated by causing the gases to communicate through the second flow path R2 via the ventilation membrane 40.

If the pressure inside the housing 120 (the internal pressure) is rapidly increased, such as when abnormality occurs in the battery 110, the contact surface 312c of the explosion-proof valve 310 is separated from the outer surface of the housing 120, and the explosion-proof valve 310 is elastically deformed to open the first flow path R1. Consequently, gases flow from the inside of the housing 120 to the outside of the housing 120 via the first flow path R1, and thereby the pressure difference between the pressure inside the housing 120 (the internal pressure) and the pressure outside the housing 120 (the external pressure) is eliminated.

(Assembly)

In the ventilation unit 3 configured as described above, the explosion-proof valve 310 is press-fitted over the outer circumferential surface of the support body 330, and thereby the support body 330 and the explosion-proof valve 310 are integrated. The middle-stage outward protruding portion 334 of the support body 330 is fitted into the concave part 313a formed in the downward protruding portion 313 of the explosion-proof valve 310, and thereby the position of the explosion-proof valve 310 in the centerline direction is determined.

(Inspection)

In the ventilation unit 3 related to the third exemplary embodiment, after the ventilation unit 3 is assembled, it is possible to easily inspect whether or not the explosion-proof valve 310 functions. The ventilation unit 3 is attached to a plate-like inspection jig in which a through hole, like the insertion hole 121 and the surrounding through holes 121c of the housing 120, is formed. Then, it is possible to inspect the explosion-proof valve 310 that, when the pressure on the lower surface 312b side of the inclined portion 312 of the explosion-proof valve 310 is increased to be higher than the pressure on the upper surface 312a side of the inclined portion 312 by value not less than a predetermined value, the contact surface 312c of the explosion-proof valve 310 is separated from the surface of the inspection jig to open the first flow path R1. Then, in the ventilation unit 3 related to the third exemplary embodiment, since the contact surface 312c of the explosion-proof valve 310 contacts the surface of the inspection jig to close the first flow path R1 after the inspection is completed, the ventilation unit 3 can be used as a product after inspection. Therefore, according to the ventilation unit 3 related to the third exemplary embodiment, it is possible to easily inspect whether or not the explosion-proof valve 310 functions after the ventilation unit 3 has been assembled, as compared to the case where, for example, the explosion-proof valve performs the opening operation with breaking or detaching of a part of components.

Figure 14:
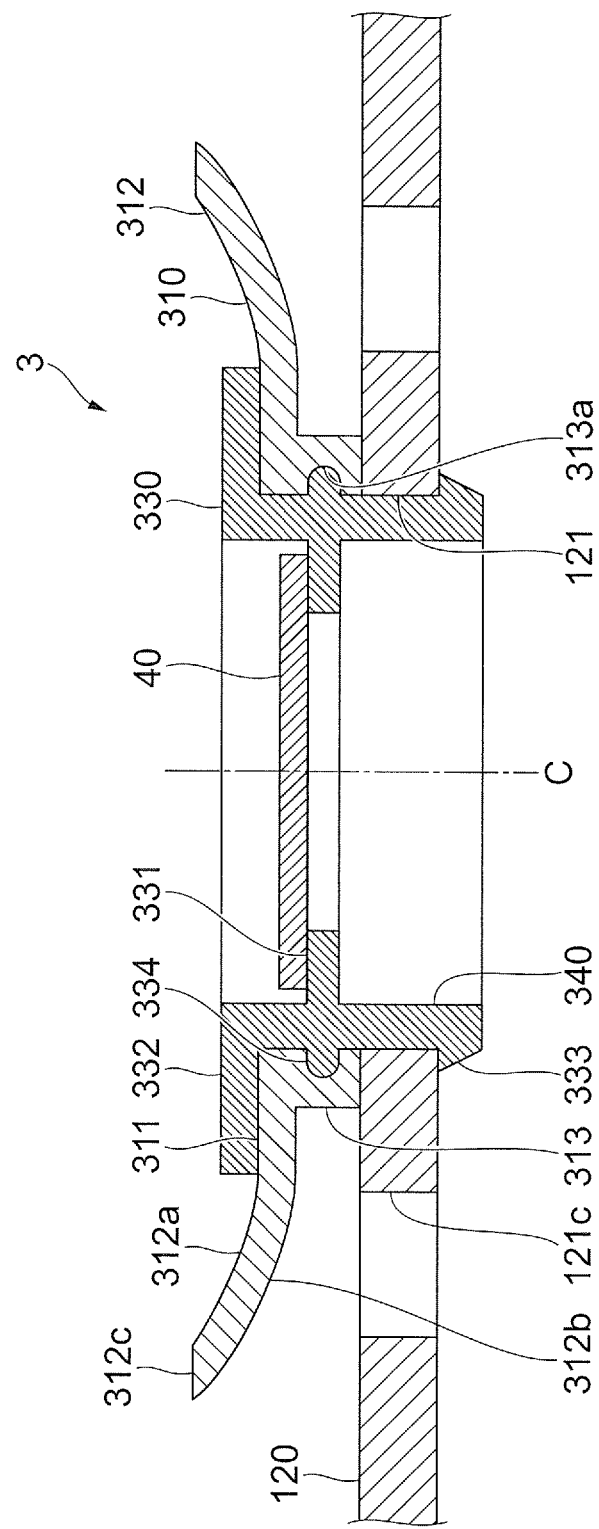
FIG. 14 is a diagram showing an example of a state after a function of the explosion-proof valve related to the third exemplary embodiment was inspected.

FIG. 14 is a diagram showing an example of a state after the function of the explosion-proof valve 310 related to the third exemplary embodiment was inspected. In the state shown in FIG. 14, the inclined portion 312 is deformed so that the upper surface 312a and the lower surface 312b are reversed with respect to the annular portion 311 as a fulcrum (the upper surface 312a is positioned inside (the centerline C side) and the lower surface 312b is positioned outside).

Even though the deformation in the state shown in FIG. 14 is achieved by increasing the pressure on the lower surface 312b side of the inclined portion 312 of the explosion-proof valve 310 to be higher than the pressure on the upper surface 312a side of the inclined portion 312 by a value not less than a predetermined value, the contact surface 312c can be returned again to contact the surface of the inspection jig, to thereby close the first flow path R1, because the material of the explosion-proof valve 310 is the thermosetting elastomer or the thermosetting rubber. Also, from this, according to the ventilation unit 3 related to the third exemplary embodiment, it is possible to easily inspect whether or not the explosion-proof valve 310 functions after the ventilation unit 3 has been assembled, as compared to the case where, for example, the explosion-proof valve performs the opening operation with breaking or detaching of a part of components.

REFERENCE SIGNS LIST 1, 2, 3 Ventilation unit
10, 210, 310 Explosion-proof valve
20 Internal pressure adjusting component
30, 330 Support body
40 Ventilation membrane
70, 270 Holding member
80 Sealing member
100 Battery pack

The invention claimed is:

1. A ventilation unit comprising:
a first ventilation body that permits gas to flow from an inside of a housing to an outside of the housing when internal pressure, which is pressure inside the housing, is higher than external pressure, which is pressure outside the housing, by a value not less than a predetermined value, and is capable of returning to block flow of the gas from the inside of the housing to the outside of the housing; and
a second ventilation body that permits gas to flow between the inside of the housing and the outside of the housing even when a pressure difference between the internal pressure and the external pressure is less than the predetermined value, wherein
the first ventilation body includes;
an annular portion in which a through hole is formed, the annular portion having an annular shape; and
an inclined portion that is provided outside in a radial direction of the annular portion and extends over a whole circumference in a direction inclined with respect to a hole direction of the through hole.

2. The ventilation unit according to claim 1, wherein the inclined portion closes a first flow path when a pressure difference between the internal pressure and the external pressure is a value less than the predetermined value even if the internal pressure is higher than the external pressure, and is deformed to open the first flow path when the internal pressure is higher than the external pressure by a value not less than the predetermined value.

3. The ventilation unit according to claim 1, wherein the second ventilation body is a ventilation membrane that is provided to close a second flow path formed in the through hole and permits gas to flow between the inside of the housing and the outside of the housing via the second flow path.

4. The ventilation unit according to claim 2, wherein the second ventilation body is a ventilation membrane that is provided to close a second flow path formed in the through hole and permits gas to flow between the inside of the housing and the outside of the housing via the second flow path.

5. The ventilation unit according to claim 3, wherein a material of the ventilation membrane is fluoride resin.

6. The ventilation unit according to claim 4, wherein a material of the ventilation membrane is fluoride resin.

7. The ventilation unit according to claim 5, wherein a reinforcing material is laminated to form a layer on at least one surface of the ventilation membrane.

8. The ventilation unit according to claim 6, wherein a reinforcing material is laminated to form a layer on at least one surface of the ventilation membrane.

9. The ventilation unit according to claim 3, further comprising:
a cover that covers the ventilation membrane.

10. The ventilation unit according to claim 4, further comprising:
a cover that covers the ventilation membrane.

11. A ventilation unit comprising:
a first ventilation body that closes a first flow path when a pressure difference between internal pressure, which is pressure inside a housing, and external pressure, which is pressure outside the housing, is a value less than a predetermined value, and is elastically deformed to open the first flow path when the internal pressure is higher than the external pressure by a value not less than the predetermined value; and
a second ventilation body that is provided to a second flow path and permits gas to flow between the inside of the housing and the outside of the housing via the second flow path even when the pressure difference between the internal pressure and the external pressure is less than the predetermined value, wherein
the first ventilation body includes;
an annular portion in which a through hole is formed, the annular portion having an annular shape; and
an inclined portion that is provided outside in a radial direction of the annular portion and extends over a whole circumference in a direction inclined with respect to a hole direction of the through hole.

12. The ventilation unit according to claim 11, wherein the inclined portion closes the first flow path when a pressure difference between the internal pressure and the external pressure is a value less than the predetermined value even if the internal pressure is higher than the external pressure, and is deformed to open the first flow path when the internal pressure is higher than the external pressure by a value not less than the predetermined value.

13. The ventilation unit according to claim 11, wherein the second ventilation body is a ventilation membrane that is provided to close a second flow path formed in the through hole.

14. The ventilation unit according to claim 12, wherein the second ventilation body is a ventilation membrane that is provided to close a second flow path formed in the through hole.

15. The ventilation unit according to claim 13, wherein a material of the ventilation membrane is fluoride resin.

16. The ventilation unit according to claim 14, wherein a material of the ventilation membrane is fluoride resin.

17. The ventilation unit according to claim 15, wherein a reinforcing material is laminated to form a layer on at least one surface of the ventilation membrane.

18. The ventilation unit according to claim 16, wherein a reinforcing material is laminated to form a layer on at least one surface of the ventilation membrane.

19. The ventilation unit according to claim 13, further comprising:

a cover that covers the ventilation membrane.

20. The ventilation unit according to claim 14, further comprising:

a cover that covers the ventilation membrane.

\* \* \* \* \*